United States Patent
Feldtkeller

(10) Patent No.: US 11,228,242 B2
(45) Date of Patent: Jan. 18, 2022

(54) POWER CONVERTER AND METHOD FOR DRIVING AN ELECTRONIC SWITCH

(71) Applicant: Infineon Technologies Austria AG, Villach (AT)

(72) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 31 days.

(21) Appl. No.: 16/902,786

(22) Filed: Jun. 16, 2020

(65) Prior Publication Data

US 2020/0412232 A1    Dec. 31, 2020

(30) Foreign Application Priority Data

Jun. 28, 2019   (EP) ..................... 19183134

(51) Int. Cl.
*H02M 3/00*   (2006.01)
*H02M 1/08*   (2006.01)
*H02M 3/335*   (2006.01)
*H02M 3/156*   (2006.01)

(52) U.S. Cl.
CPC .............. *H02M 3/01* (2021.05); *H02M 1/08* (2013.01); *H02M 3/156* (2013.01); *H02M 3/33523* (2013.01)

(58) Field of Classification Search
CPC .......... H02M 3/01; H02M 1/08; H02M 3/156; H02M 3/33523; H02M 1/0058; H02M 3/33507
See application file for complete search history.

(56) References Cited

U.S. PATENT DOCUMENTS

| | | | |
|---|---|---|---|
| 2014/0211510 A1* | 7/2014 | Feldtkeller | H02M 3/24 363/15 |
| 2017/0288554 A1 | 10/2017 | Fahlenkamp et al. | |
| 2020/0382005 A1* | 12/2020 | Feldtkeller | H02M 1/32 |
| 2021/0006147 A1* | 1/2021 | Feldtkeller | H02M 1/4225 |

FOREIGN PATENT DOCUMENTS

| | | |
|---|---|---|
| DE | 102014216827 A1 | 6/2016 |
| DE | 102017221786 A1 | 4/2019 |

OTHER PUBLICATIONS

EP Search Report, EP 19 18 3134, dated Dec. 19, 2019, pp. 8.

* cited by examiner

*Primary Examiner* — Kyle J Moody
(74) *Attorney, Agent, or Firm* — Armis IP Law, LLC

(57) ABSTRACT

A method for operating an electronic switch in a power converter and a control circuit for operating an electronic switch in a power converter are disclosed. The method includes: driving an electronic switch coupled to an inductor in a power converter in successive drive cycles each including an on-time and an off-time, wherein the off-time includes a demagnetization time period in which the inductor is demagnetized and a delay time, and wherein an end of the delay time is dependent on the occurrence of a predefined number of signal pulses of a pulse signal. The pulse signal includes a first portion that represents local minima of a voltage across the switch and, a second portion that includes signal pulses obtained by timely extrapolating the pulse signal of the first portion.

16 Claims, 13 Drawing Sheets

POWER CONVERTER AND METHOD FOR DRIVING AN ELECTRONIC SWITCH

RELATED APPLICATION

This application claims priority to earlier filed European Patent Application Serial Number EP19183134 entitled "METHOD FOR DRIVING A SWITCH IN A POWER CONVERTER CIRCUIT AND POWER CONVERTER CIRCUIT," filed on Jun. 28, 2019, the entire teachings of which are incorporated herein by this reference.

BACKGROUND

Switched-mode power converter circuits are widely used to convert power in various kinds of electronic applications such as automotive, industrial, telecommunication, household or consumer electronic applications. A switched-mode power converter may include an electronic switch, an inductor coupled to the electronic switch, and a rectifier circuit coupled to the inductor. Converting power with a switched-mode power converter of this type usually includes receiving an input voltage and an input current at an input by the power converter and driving the electronic switch in a plurality of successive drive cycles, each including an on-time and an off-time, wherein the inductor receives energy from the input during the on-time and transfers energy to the rectifier circuit during the off-time. Receiving energy by the transformer is associated with magnetizing the transformer and transferring energy by the transformer is associated with demagnetizing the transformer. An output parameter, such as an output voltage or an output current, of the power converter may be regulated by suitably adjusting durations of the on-times and the off-times.

BRIEF DESCRIPTION OF EMBODIMENTS

Some types of power converters, such as flyback converters, can be operated in quasi-resonant mode. In this operating mode, there is a delay time between a time instance at which the transformer has been completely demagnetized and a time instance at which a new drive cycle starts so that the switch again switches on. During this delay time, a parasitic oscillation of a voltage across the inductor and the switch may occur, wherein this oscillation results from an inductance of the inductor and parasitic capacitances, such as parasitic capacitances of the switch. The parasitic oscillation may be detected and used to decide when to switch on the switch for the next time. The switch may be switched on, for example, only at those time instances at which a local minimum (valley) of the voltage across the switch occurs.

A power converter circuit may be operated in the quasi-resonant mode under low load conditions, that is, when a power consumption of a load supplied by the power converter is low. Basically, the lower the power consumption of the load, the longer the delay time between the demagnetization time instance and the beginning of a new drive cycle. The parasitic oscillation, however, decays. Thus, the desired delay time should not be longer than a time period in which the parasitic oscillation decays to such an extent that local minima or the like can no longer be detected. Otherwise, the switch may remain switched off because an event that triggers switching on the switch, such as a local minimum of the voltage across the switch, will no longer be detected.

The power converter may change from the quasi-resonant mode to another operating mode, such as a variable frequency mode in which a frequency generator determines the time instances at which the switch switches on. A change of the operating mode, however, may result in a discontinuity of the power transferred to the load. There is therefore a need to operate a power converter over a wide output power range in which the output power can be varied continuously.

One example relates to a method. The method includes driving an electronic switch coupled to an inductor in a power converter in successive drive cycles, each including an on-time and an off-time. The off-time includes a demagnetization time period in which the inductor is demagnetized and a delay time, wherein an end of the delay time is dependent on the occurrence of a predefined number of signal pulses of a pulse signal comprising a plurality of successive signal pulses. Further, the pulse signal includes a first portion that represents local minima of a voltage across the switch and, a second portion that includes signal pulses obtained by timely extrapolating the pulse signal of the first portion.

Another example relates to a control circuit configured to drive an electronic switch coupled to an inductor in a power converter in successive drive cycles, each including an on-time and an off-time, wherein the off-time includes a demagnetization time period in which the inductor is demagnetized and a delay time. The control circuit is configured to end the delay time dependent on the occurrence of a predefined number of signal pulses of a pulse signal that includes a plurality of successive signal pulses, and to generate the pulse signal such that a first portion represents local minima of a voltage across the switch and, a second portion includes signal pulses obtained by timely extrapolating the pulse signal generated of the first portion.

Further embodiments herein include an apparatus comprising: an inductor device; a switch coupled to the inductor; a controller operative to control operation of the switch for each of multiple control cycles to convert an input voltage into an output voltage, activation of the switch during an ON-time causing current to flow through the inductor and the switch, deactivation of the switch during an OFF-time causing current to flow through the inductor and the switch; the controller operative to: during the OFF-time, after passage of an amount of time with respect to deactivating the switch, detect occurrence of oscillations of a voltage across the switch; and initiate re-activation of the switch in a subsequent control cycle after a time delay with respect to the detected occurrence of oscillations of the voltage across the switch.

In yet further example embodiments, the apparatus further includes an auxiliary winding magnetically coupled to the inductor, the auxiliary winding producing the oscillations of the voltage; and wherein the controller monitors the auxiliary winding to detect the oscillations.

Yet further embodiments herein an apparatus wherein deactivation of the switch during the time delay demagnetizes the inductor.

BRIEF DESCRIPTION OF DRAWINGS

Examples are explained below with reference to the drawings. The drawings serve to illustrate certain principles, so that only aspects necessary for understanding these principles are illustrated. The drawings are not to scale. In the drawings the same reference characters denote like features.

BRIEF DESCRIPTION AND DETAILED DESCRIPTION OF EMBODIMENTS

In the following detailed description, reference is made to the accompanying drawings. The drawings form a part of the description and for the purpose of illustration show examples of how the invention may be used and implemented. It is to be understood that the features of the various embodiments described herein may be combined with each other, unless specifically noted otherwise.

Figure 1:
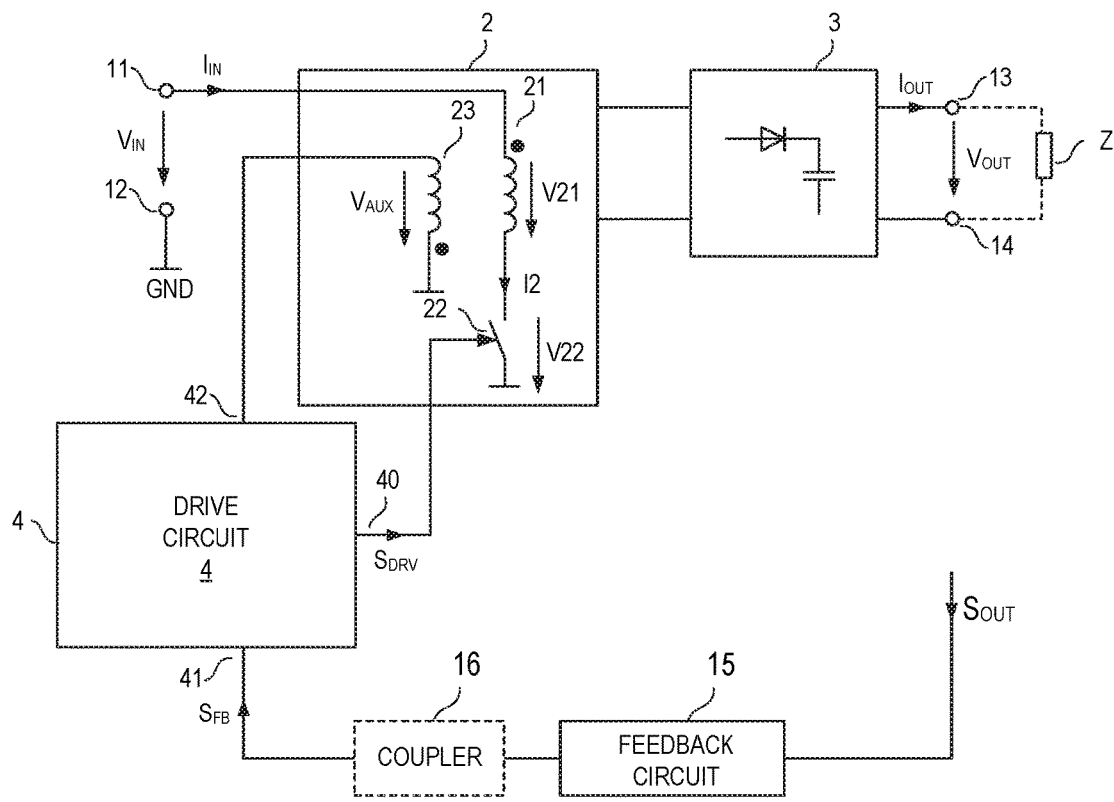
FIG. 1 illustrates one example of a power converter.

FIG. 1 illustrates one example of a power converter. This power converter includes an input 11, 12 configured to receive an input voltage $V_{IN}$ and an output 13, 14 configured to provide an output voltage $V_{OUT}$ and an output current $I_{OUT}$. The power converter may be configured to regulate an output parameter such as the output voltage $V_{OUT}$, the output current $I_{OUT}$, or an output power (which is given by the output voltage $V_{OUT}$ multiplied by the output current $I_{OUT}$) such that the output parameter has a predefined value.

Referring to FIG. 1, the power converter further includes a switching circuit 2 connected to the input 11, 12 and a rectifier circuit 3 connected between the switching circuit 2 and the output 13, 14. The switching circuit 2 includes an electronic switch 22 and an inductor 21 coupled to the electronic switch 22. The electronic switch 22 is controlled by a drive signal $S_{DRV}$ received at a drive input of the electronic switch 22 such that the electronic switch 22 switches on or off dependent on the drive signal $S_{DRV}$. Any type of electronic switch such as a MOSFET (Metal Oxide Semiconductor Field-Effect Transistor), an IGBT (Insulated Gate Bipolar Transistor), a HEMT (High Electron-Mobility Transistor), or the like may be used to implement the electronic switch 22.

In the power converter shown in FIG. 1, the inductor 21 is connected in series with the switch 22 and a current I21 through the inductor 21 is controlled by a switched-mode operation of the electronic switch 22. This is explained in further detail herein below. The switching circuit 2 may be implemented in various ways. Two examples are explained with reference to FIGS. 2 and 3 herein further below.

Referring to FIG. 1, the power converter optionally includes an auxiliary winding 23 of the transformer. This auxiliary winding 23 is inductively coupled with the primary winding $21_1$ and the secondary winding $21_2$. A voltage $V_{AUX}$ across the auxiliary winding 23 is referred to as auxiliary voltage in the following. The auxiliary voltage $V_{AUX}$ is essentially proportional to a voltage V21 across the inductor 21, wherein a proportionality factor between the auxiliary voltage $V_{AUX}$ and the voltage V21 across the inductor 21 is dependent on a ratio between a number of turns of the auxiliary winding 23 and a number of turns of the inductor. According to one example, the auxiliary voltage $V_{AUX}$ is a voltage referenced to the second input node 12. This second input node 12 is also referred to as ground node in the following. The voltage V21 across the inductor 21 is also referred to as inductor voltage in the following.

Referring to FIG. 1, the power converter further includes a feedback circuit 15. The feedback circuit 15 receives an output signal $S_{OUT}$ that represents the output parameter that is to be regulated. That is, the output signal $S_{OUT}$ may represent the output voltage $V_{OUT}$, the output current $I_{OUT}$, or the output power $P_{OUT}$. According to one example, the output signal $S_{OUT}$ represents the output voltage $V_{OUT}$ and is essentially proportional to the output voltage Your. According to another example, the output signal $S_{OUT}$ represents the output current $I_{OUT}$ and is essentially proportional to the output current $I_{OUT}$. The output signal $S_{OUT}$ may be obtained by measuring the respective output parameter in a conventional way using any kind of voltage, current or power measurement circuit. Such circuits are commonly known so that no further explanations are required in this regard.

The feedback circuit 15 is configured to generate a feedback signal $S_{FB}$ based on the output signal $S_{OUT}$. The power converter further includes a drive circuit 4 that receives the feedback signal $S_{FB}$ at a first input 41 and is configured to generate the drive signal $S_{DRV}$ at an output 40 based on the feedback signal $S_{FB}$. Referring to FIG. 1, a load Z (illustrated in dashed lines) connected to the output 13, 14 may receive the output power provided by the power converter. Dependent on a power consumption of the load Z, the regulated output parameter, such as the output voltage $V_{OUT}$ or the output current $I_{OUT}$, may vary. The feedback circuit 15 is configured to generate the feedback signal $S_{FB}$ in such a way that the feedback signal $S_{FB}$—based on which the electronic switch 22 is driven—counteracts such variations of the regulated output parameter. More specifically, the feedback signal $S_{FB}$ is generated in such a way that, in a steady state of the power converter, an input power of the power converter, which is controlled by the switched-mode operation of the electronic switch 22, essentially equals the output power received by the load Z. The feedback circuit 15 and the drive circuit 4 form a control loop that is configured to regulate the output parameter.

Generating the feedback signal $S_{FB}$ by the feedback circuit 15 may include comparing the output signal $S_{OUT}$ with a reference signal $S_{REF}$, calculating an error signal based on comparing the output signal $S_{OUT}$ with the reference signal $S_{REF}$, and generating the feedback signal $S_{FB}$ based on the error signal. The reference signal $S_{REF}$ represents a desired value of the output parameter. Generating the feedback signal $S_{FB}$ based on the error signal may include filtering the error signal using a filter with any one of a P (proportional) characteristic, an I (integrating) characteristic, a PI (proportional-integrating) characteristic or a PID (proportional-integrating-deriving) characteristic. Generating a feedback signal in a power converter based on an error signal is commonly known, so that no further explanation is required in this regard.

Referring to FIG. 1, a coupler 16 may be connected between the feedback circuit 15 and the drive circuit 4. Such coupler 16 may be used, for example, when there is a galvanic isolation between the input 11, 12 and the output 13, 14. A galvanic isolation between the input and the output may be formed by any kind of transformer connected between the input 11, 12 and the output 13, 14. The coupler 16 is configured to transmit the feedback signal $S_{FB}$ from the feedback circuit 15 via the galvanic isolation to the drive circuit 4. The coupler 16 may include an optocoupler, an inductive coupler, a capacitive coupler, or the like.

Figure 2:
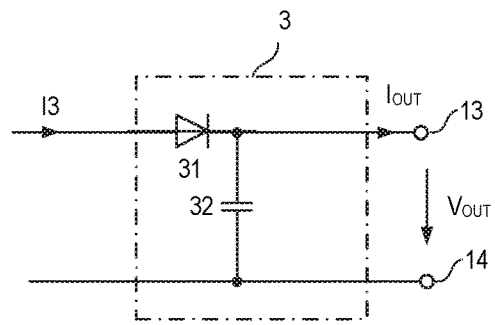
FIG. 2 illustrates one example of a rectifier circuit in the power converter according to FIG. 1.

The rectifier circuit 3 is configured to rectify a voltage provided by the switching circuit 2. The rectifier circuit 3 may be implemented in various ways. One example of the rectifier circuit 3 is illustrated in FIG. 2. In this example, the rectifier circuit 3 includes a series circuit with a rectifier element 31 and a capacitor 32 connected to the secondary winding $21_2$. The output voltage $V_{OUT}$ is a voltage across the capacitor 32 according to one example.

Referring to the above, the switching circuit 2 may be implemented in various ways. Two examples are explained with reference to FIGS. 3 and 4 in the following. In the example illustrated in FIG. 3, the power converter is implemented as a flyback converter, and in the example illustrated in FIG. 4, the power converter is implemented as a boost converter.

Figure 3:
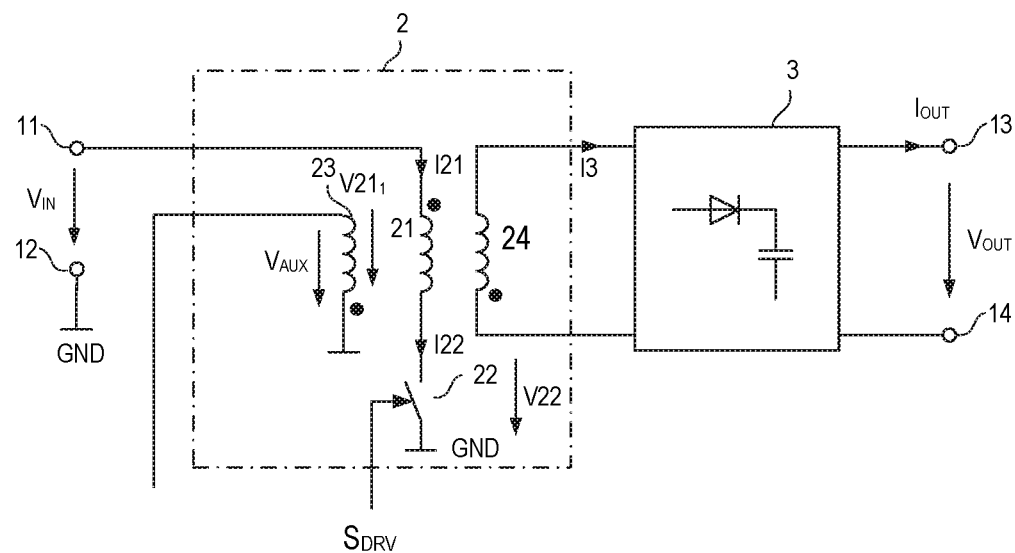
FIG. 3 illustrates one example of a power converter implemented as a flyback converter.

The flyback converter shown in FIG. 3, includes a transformer with a primary winding 21 and a secondary winding 24, wherein the primary winding 21 forms the inductor connected in series with the electronic switch 22. The series circuit including the primary winding $21_1$ and the electronic switch 22 is connected to the input 11, 12. That is, the series circuit including the primary winding 21 and the electronic switch 22 is connected between a first input node 11 and a second input node 12 of the input 11, 12. The secondary winding 24 is inductively coupled with the primary winding 21 and is connected to the rectifier circuit 3. According to one example, a winding sense of the secondary winding 21 is opposite to a winding sense of the primary winding 21. In this power converter, the current I21 through the primary winding 21 of the transformer is controlled by a switched-mode operation of the electronic switch 22. The inductor voltage V21 is the voltage across the primary winding 21 in this example. The transformer provides for a galvanic isolation between the input 11, 12 and the output 13, 14, so that the input voltage $V_{IN}$ and the output voltage $V_{OUT}$ may be referenced to different potentials.

Figure 4:
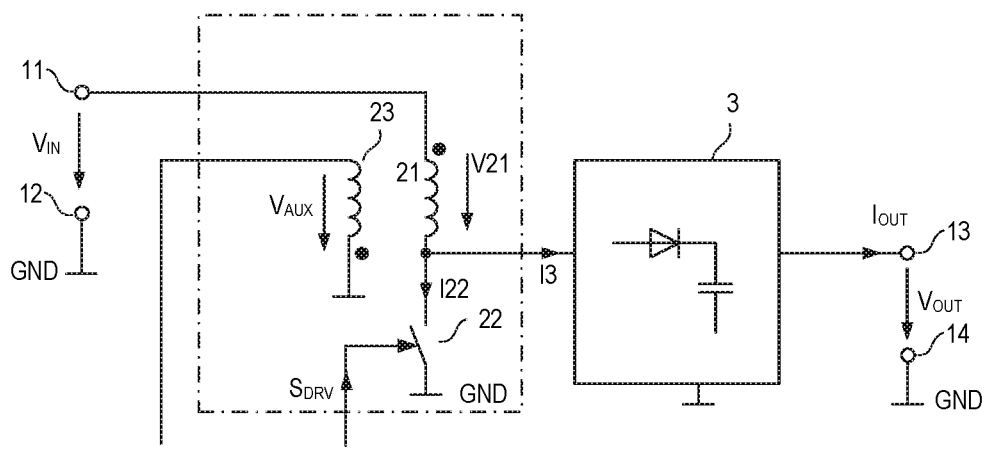
FIG. 4 illustrates one example of a power converter implemented as a boost converter.

In the boost converter shown in FIG. 4, the inductor 21 is a choke, for example, and is connected in series with the switch 22, wherein the series circuit including the inductor 21 and the electronic switch 22 is connected to the input 11, 12. The rectifier circuit 3 is connected between a circuit node at which the inductor 21 and the switch 22 are connected and the output 13, 14. In this power converter, the input voltage $V_{IN}$ and the output voltage $V_{OUT}$ may be referenced to the same potential.

Operating the electronic switch 22 in a switched-mode fashion includes operating the electronic switch 22 in a plurality of successive drive cycles, wherein in each of these drive cycles the electronic switch 22 switches on for an on-time and switches off for an off-time. This is explained in further detail with reference to FIG. 5 below.

Figure 5:
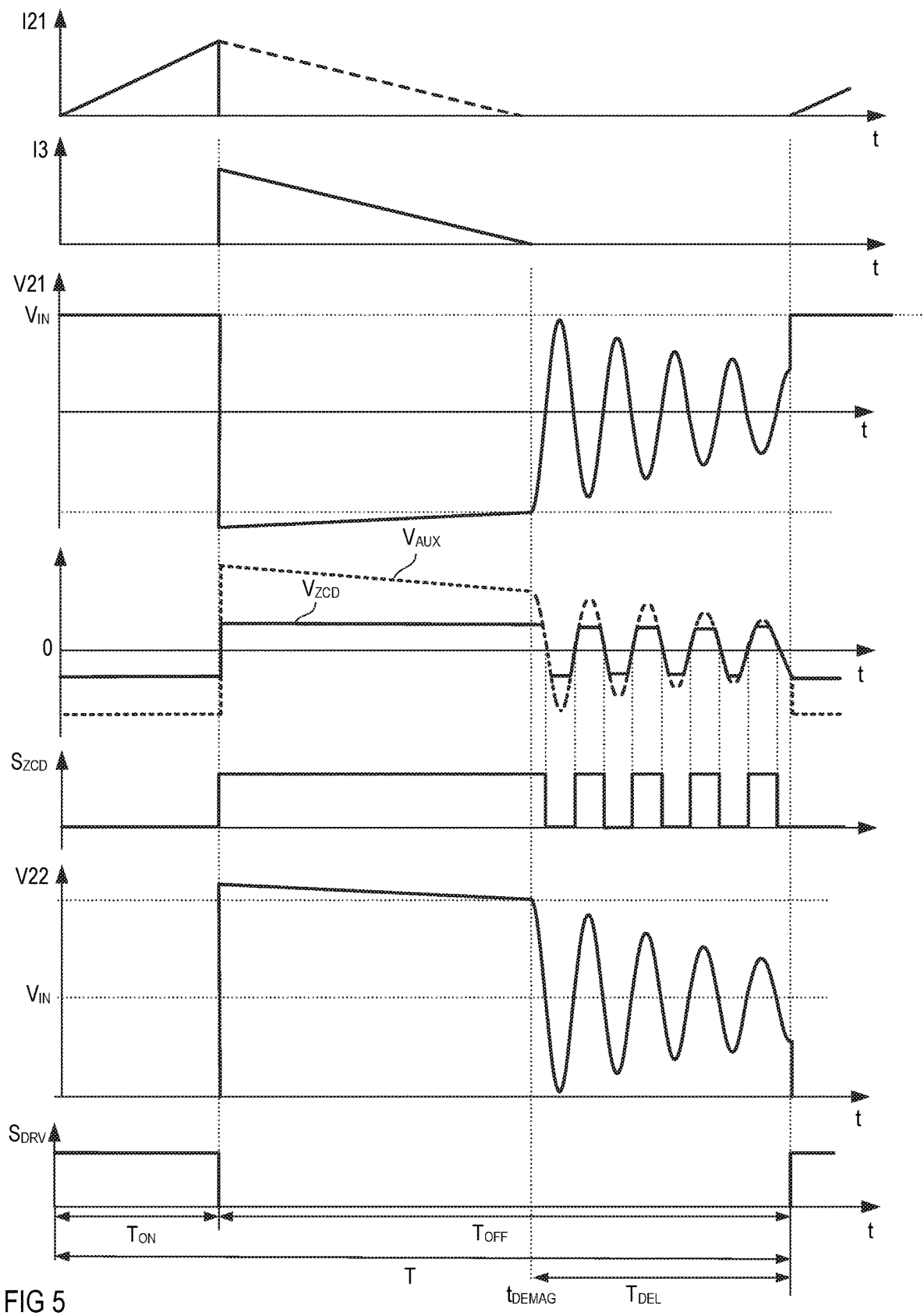
FIG. 5 shows signal diagrams that illustrate operating the power converter in a quasi-resonant mode.

FIG. 5 illustrates signal diagrams of the current I21 through the inductor 21, a voltage V21 across the inductor, the auxiliary voltage $V_{AUX}$, a voltage V22 across the switch 22, and the drive signal $S_{DRV}$. Further, FIG. 5 also illustrates the current I3 through the secondary winding of the transformer when the power converter is implemented as a flyback converter. FIG. 5 illustrates operating the power converter in one drive cycle. A duration T of this drive cycle is given by a duration $T_{ON}$ of an on-time plus a duration $T_{OFF}$ of an off-time. The "on-time" is the time period in which the electronic switch 22 is switched on, and the "off-time is the time period in which the electronic switch 22 is switched off. The electronic switch 22 switches on when the drive signal $S_{DRV}$ has an on-level and switches off when the drive signal $S_{DRV}$ has an off-level. Just for the purpose of illustration, the on-level is a high signal level and the off-level is a low signal level in the example illustrated in FIG. 5.

Referring to FIG. 5, the inductor current I21 increases during the on-time (wherein an increase of the primary current I21 is essentially proportional to the input voltage $V_{IN}$ and inversely proportional to an inductance of the inductor 21). In a flyback converter, during the on-time, the current I3 through the secondary winding 24 is zero. In each case, the inductor voltage V21 essentially equals the input voltage $V_{IN}$, and the switch voltage V22 is essentially zero. In the example illustrated in FIG. 5, the winding sense of the auxiliary voltage $V_{AUX}$ is such that the auxiliary voltage $V_{AUX}$ is negative during the on-time. A magnitude of the auxiliary voltage $V_{AUX}$ is proportional to a magnitude of the inductor voltage V21. Thus, during the on-time, a magnitude of the auxiliary voltage $V_{AUX}$ is proportional to the input voltage $V_{IN}$.

When the switch 22 switches off, (a) in a flyback converter, the inductor current I21 (and a current I22 through the switch 22) turns zero and the current I3 through the secondary winding 24 jumps to an initial value from which it gradually decreases; and (b) in a boost converter the inductor current I21 decreases from a level it has reached at the end of the on-time (and the current I22 through the switch 22 turns zero). In both cases, the inductor voltage V21 and, equivalently, the auxiliary voltage $V_{AUX}$ change their polarity. The magnitude of the inductor voltage V21 is essentially given (a) by $n \cdot V_{OUT}$ in a flyback converter, wherein n is given by a ratio between a number $N_1$ of turns of the primary winding $21_1$ and a number of turns $N_2$ of the secondary winding $21_2$ ($n = N_1/N_2$); and (b) $V_{OUT} - V_{IN}$ in a boost converter, wherein $V_{OUT}$ is higher than $V_{IN}$. During the off-time, a magnitude of the auxiliary voltage $V_{AUX}$ is again proportional to the inductor voltage. Further, during the off-time, the switch voltage V22 (a) essentially equals the input voltage $V_{IN}$ plus the magnitude of the inductor voltage V21 in a flyback converter; and essentially equals the output voltage $V_{OUT}$ in a boost converter.

During the on-time, energy is magnetically stored in the inductor 21 and, during the off-time, this energy is transferred from the inductor 21 via the rectifier circuit 3 to the output 13, 14. Storing energy in the inductor 21 is associated with magnetizing the inductor and transferring the energy from the inductor 21 to the output 13, 14 is associated with demagnetizing the inductor. In the example illustrated in FIG. 5, the off-time is long enough for the inductor 21 to be completely demagnetized. When the transformer is completely demagnetized, the (negative) inductor voltage V21 increases and the (positive) auxiliary voltage $V_{AUX}$ decreases. In FIG. 5, $t_{DEMAG}$ denotes a time instance at which the inductor has been demagnetized. Further, in the example illustrated in FIG. 5, there is a delay time $T_{DEL}$ between the demagnetization time instance $t_{DEMAG}$ and the beginning of a new drive cycle, when the switch 22 again switches on. This type of operating mode of the power converter is usually referred to as discontinuous current mode (DCM).

During the delay time $T_{DEL}$, that is, after the transformer has been completely demagnetized, parasitic oscillations of the inductor voltage V21 and the switch voltage V22 may occur. These oscillations may result from the inductance of the inductor and parasitic capacitors, such as a parasitic output capacitor of the switch 22. During the oscillations, the switch voltage V22 oscillates around a voltage level that is given by the voltage level of the input voltage. In order to reduce losses that are associated with switching on the switch 22 it may be desirable to switch on the switch 22 when the switch voltage V22 has reached a local minimum. A DCM in which the switch 22 switches on when the switch voltage 22 has reached a minimum is usually referred to as quasi-resonant mode.

Referring to FIG. 5, the switch voltage V22 reaches a first minimum approximately one half (50%) of the duration of one period of the parasitic oscillations after the demagnetization time instance $t_{DEMAG}$. Basically, a time difference between the demagnetization time instance $t_{DEMAG}$ and locally minima (valleys) of the switch voltage V22 is given by $(i-0.5) \cdot T_{OSC}$, wherein $T_{OSC}$ is the duration of one period of the parasitic oscillations and is briefly referred to as one oscillation period in the following, and i is an integer, wherein i>1. The auxiliary voltage $V_{AUX}$ oscillates around zero and may be used to detect those time instances at which the switch voltage V22 reaches local minima Basically, a local minimum of the switch voltage V22 occurs one quarter (25%) of one oscillation period $T_{OSC}$ after the auxiliary voltage $V_{AUX}$ has crossed zero in a predefined direction. In the example shown in FIG. 5, local minima of the switch voltage V22 occur one quarter (25%) of one oscillation period after the auxiliary voltage $V_{AUX}$ has turned negative. A first local minimum of the switch voltage V22 occurs one quarter of one oscillation period after a first zero crossing of the auxiliary voltage $V_{AUX}$ during the off-time. In the example illustrated in FIG. 5, several local minima (valleys) are allowed to pass before the switch 22 switches on. This is usually referred to as valley skipping. Switching on the electronic switch 22 outside a valley may result in significantly increased switching losses, in particular, when the switch voltage V22 is high.

Figure 6A:
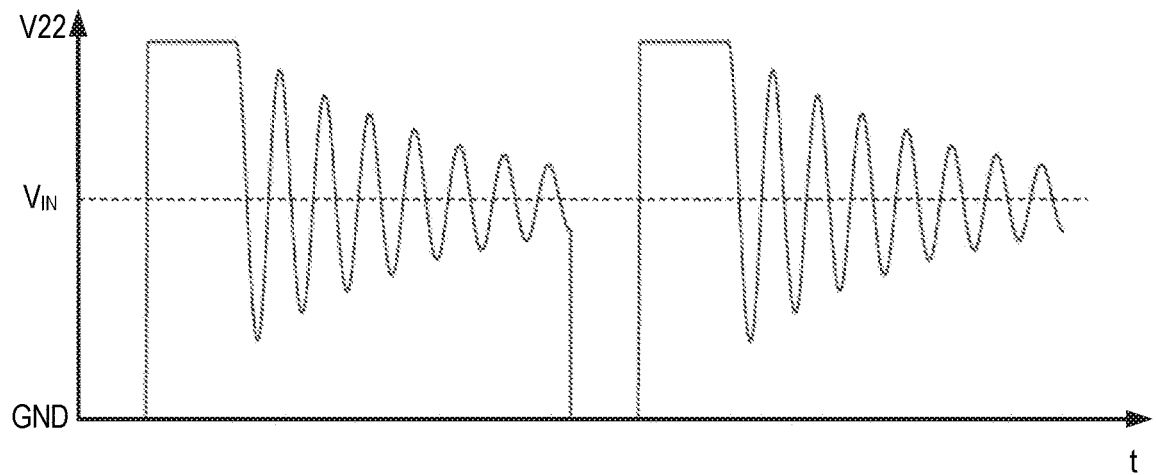
FIGS. 6A to 6D show different signal diagrams of a voltage across a switch in the power converter.
Figure 6B:
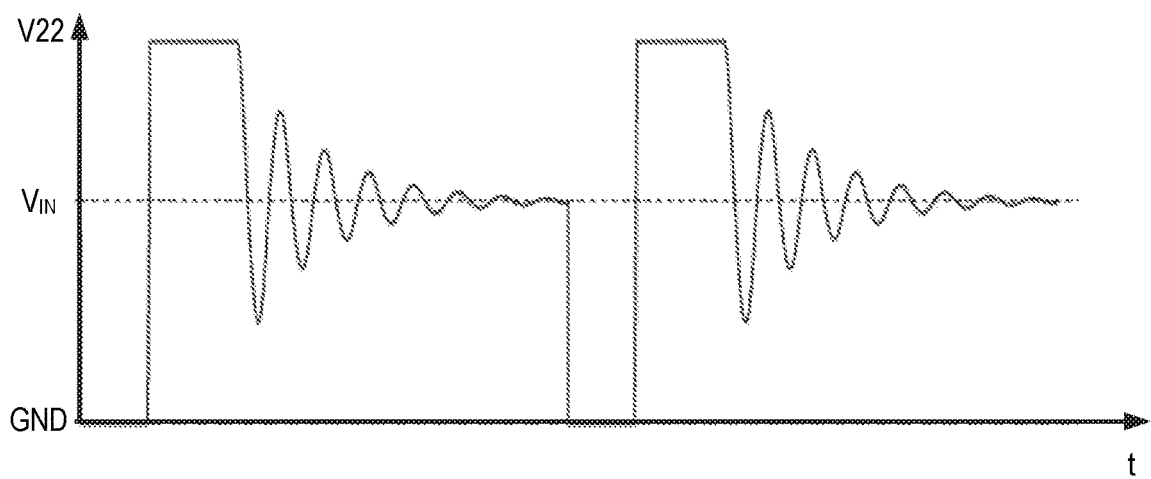

Valley skipping is used, in particular, when a power consumption of the load Z is low. Basically, the delay time $T_{DEL}$ increases and the number of valleys that are skipped before the switch 22 again switches on increases as the power consumption of the load decreases. The switch voltage V22 and, therefore, the auxiliary voltage $V_{AUX}$, can have different waveforms depending on the input voltage $V_{IN}$, for example. Some examples of the switch voltage V22 are illustrated in FIGS. 6A to 6D. FIGS. 6A and 6B illustrate the switch voltage V22 when the input voltage $V_{IN}$ is rather high, and in the examples shown in FIGS. 6C and 6D the input voltage $V_{IN}$ is rather low. In each case, the parasitic oscillations decay during the delay time $T_{DEL}$, that is, an amplitude of the parasitic oscillations decreases over the delay time $T_{DEL}$.

This decaying of the parasitic oscillations during the delay time $T_{DEL}$ usually limits using the quasi-resonant operating mode to delay times that are short enough to reliably detect zero crossings of the auxiliary voltage $V_{AUX}$. For longer delay times, zero crossings of the auxiliary voltage $V_{AUX}$ might not be detectable. The delay time within which zero crossings can be detected reliably may vary dependent on various parameters such as the input voltage $V_{IN}$. Basically, the number of skipped valleys may increase as a power consumption of the load Z decreases. In a conventional approach, a maximum number of valleys that are allowed to be skipped is defined, and the power converter changes into another operating mode when the power consumption decreases to below a power consumption at which the maximum number of skipped valleys has been reached. Changing into another operating mode, however, may result in a discontinuity of the power output by the power converter to the load Z.

Figure 7:
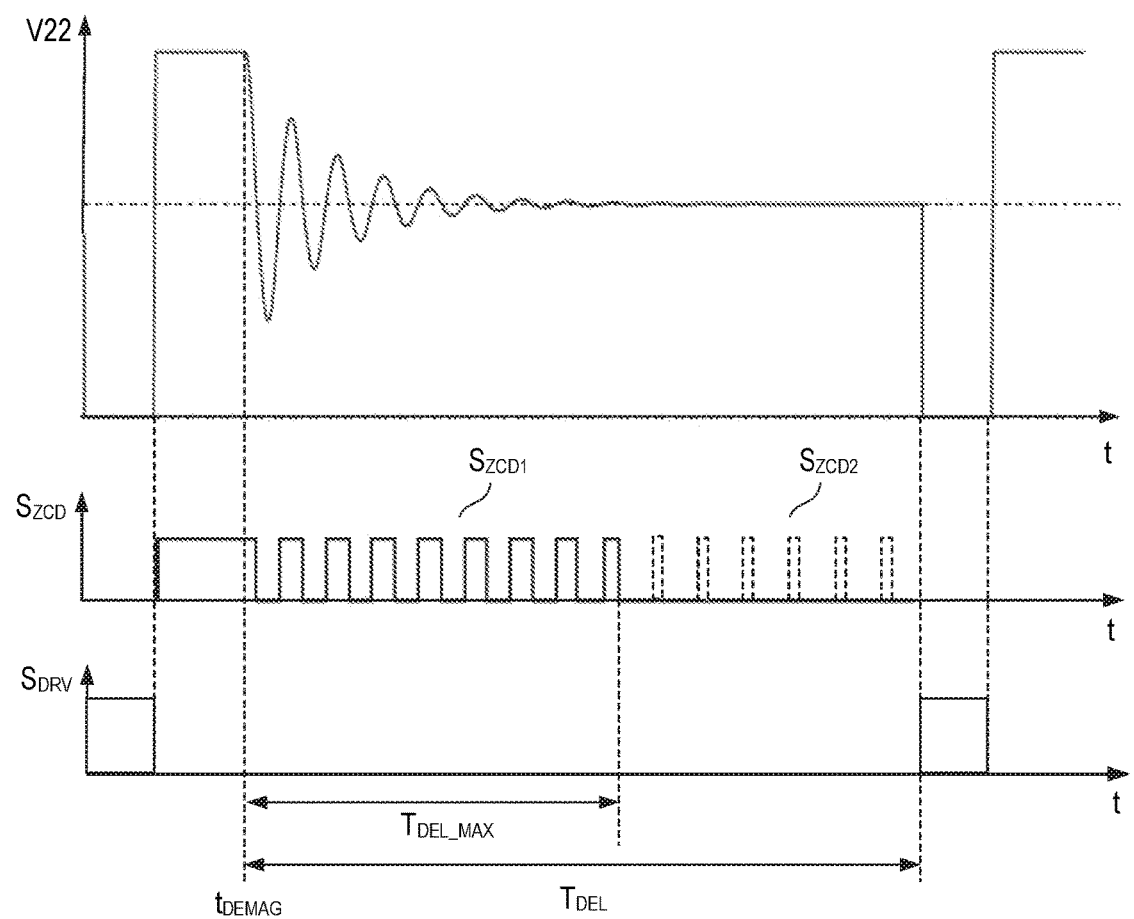
FIG. 7 show signal diagrams that illustrate operating the power converter in an extended valley skipping mode.

FIG. 7 illustrates one example of a method for operating the power converter. In this method, the delay time $T_{DEL}$ is extended beyond a delay time threshold $T_{DEL\_MAX}$ by artificially generating signal pulses of a pulse signal $S_{ZCD}$ signal. This method, which may be referred to as extended valley skipping mode, makes it possible to operate the power converter in the same operating mode over a wide output power range and, in particular, when the output power is very low. Examples of artificially generating signal pulses of the pulse signal $S_{ZCD}$ are explained below.

In a conventional method, the pulse signal $S_{ZCD}$ is generated based on the auxiliary voltage $V_{AUX}$. More specifically, the pulse signal may be generated by comparing the auxiliary voltage $V_{AUX}$ with a certain threshold, such as zero. One example of a pulse signal $S_{ZCD}$ generated based on the auxiliary voltage $V_{AUX}$ is also illustrated in FIG. 5. In this case, the pulse signal $S_{ZCD}$ indicates those time instances when the auxiliary voltage $V_{AUX}$ crosses zero and, therefore, includes information on timely positions of valleys of the switch voltage V22. This kind of pulse signal is usually referred to as zero crossing detection signal. In the example shown in FIG. 5, for example, a valley of the switch voltage V22 occurs about one quarter of one oscillation period after the pulse signal $S_{ZCD}$ has an edge in a first direction, which is from a high signal level to a low signal level in this example.

Zero crossings of the auxiliary voltage might not be reliably detectable when an amplitude of the auxiliary voltage $V_{AUX}$ falls below a certain threshold. In the method illustrated in FIG. 7, signal pulses of the ZCD signal are extrapolated to beyond a time instance when the auxiliary voltage $V_{AUX}$ has fallen below a predefined threshold, wherein a frequency of these extrapolated signal pulses essentially equals the frequency of the signal pulses that can be generated based on the auxiliary voltage $V_{AUX}$ in a conventional method. Details are explained herein further below. In the example illustrated in FIG. 7, $S_{ZCD1}$ denotes signal pulses of the pulse signal $S_{ZCD}$ that are generated based on comparing the auxiliary voltage $V_{AUX}$ with a predefined threshold, and $S_{ZCD2}$ denotes signal pulses of the pulse signal $S_{ZCD}$ that are generated by extrapolation.

The signal pulses $S_{ZCD1}$ generated based on comparing the auxiliary voltage $V_{AUX}$ with a predefined threshold represent local minima of the switch voltage V22. More specifically, in this example, falling edges of these signal pulse occur one quarter of an oscillation period before local minima of the switch voltage V22. Thus, using the falling edges of these signal pulses the time instances at which local minima of the switch voltage V22 occur are defined.

Figure 8:
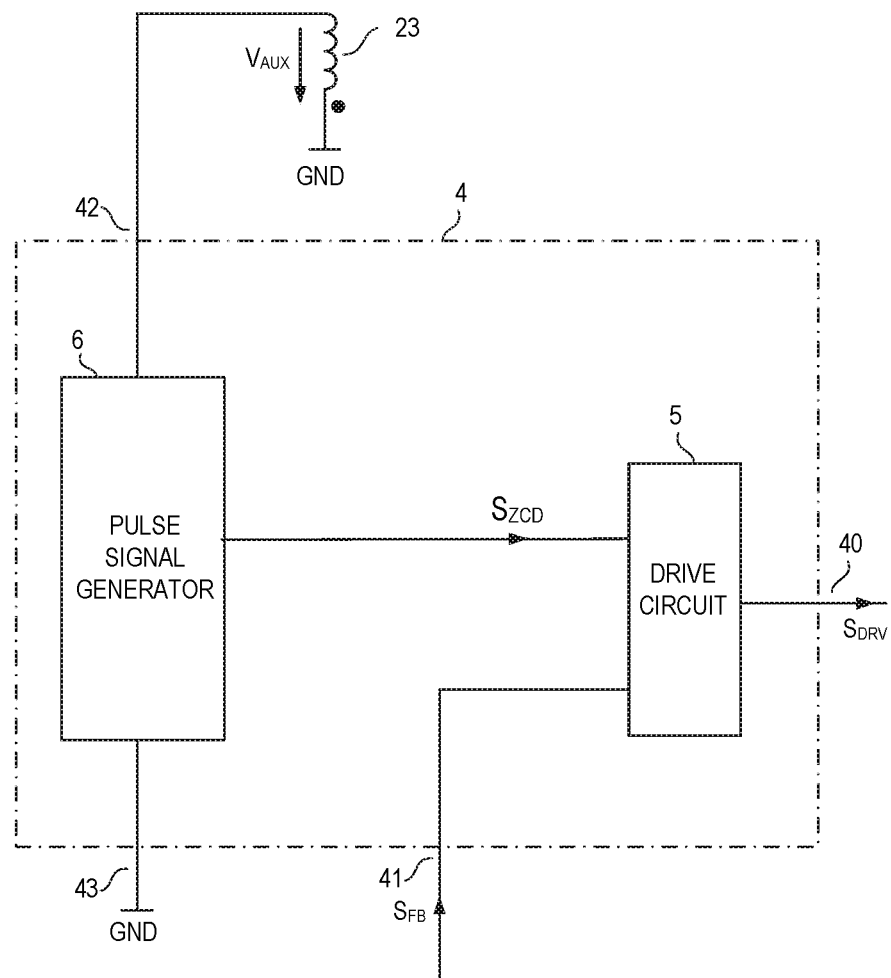
FIG. 8 illustrates one example of a control circuit con-FIG.d to operate a power converter in accordance with the method illustrated in FIG. 7.

One example of a control circuit 4 configured to operate the power converter in the method illustrated in FIG. 7 is illustrated in FIG. 8. Referring to FIG. 8, the control circuit 4 includes a second input 42 connected to the auxiliary winding 23 and a third input 43 connected to the ground note GND, so that the auxiliary voltage $V_{AUX}$ is available between the second input 42 and the third 43. In the following, the second input 42 is also referred to as auxiliary voltage input and the third input 43 is also referred to as ground input. The control circuit 4 further includes a drive circuit 5 that is configured to generate the drive signal $S_{DRV}$ based on the feedback signal $S_{FB}$ received at the first input 41 and the pulse signal $S_{ZCD}$. This pulse signal $S_{ZCD}$ is provided by a pulse signal generator 6 based on the auxiliary voltage $V_{AUX}$.

Figure 9:
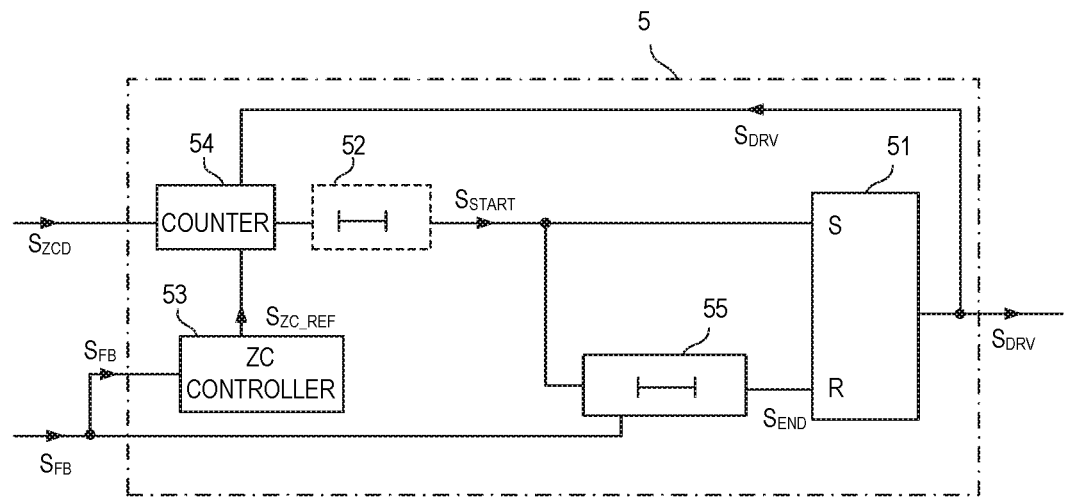
FIG. 9 illustrates one example of a drive circuit in the control circuit shown in FIG. 8.

One example of the drive circuit 5 is illustrated in FIG. 9. Referring to FIG. 9, the drive circuit 5 includes a latch 51, wherein the latch 51 provides the drive signal $S_{DRV}$. Optionally, a driver (not illustrated) is connected between the latch 51 and the switch 22 and is configured to generate the drive signal $S_{DRV}$ suitable for driving the switch 22 based on an output signal of the latch 51. The latch 51 receives an on-time start signal $S_{START}$ and an on-time end signal SEND and is configured to generate the on-level of the drive signal $S_{DRV}$ dependent on the on-time start signal $S_{START}$ and the on-time end signal $S_{END}$. The on-time start signal $S_{START}$ is briefly referred to as start signal and the on-time end $S_{END}$ signal is briefly referred to as end signal in the following. Just for the purpose of illustration, the latch 51 is an SR-flip-flop in the example shown in FIG. 9 and receives the start signal $S_{START}$ at a set input S and the end signal $S_{END}$ at a reset input R.

Referring to FIG. 9, the drive circuit 5 further includes a zero crossing controller or valley skip controller 53 that receives the feedback signal $S_{FB}$ and outputs a pulse reference signal $S_{ZC\_REF}$, and a counter 54 that receives the pulse reference signal $S_{ZC\_REF}$ and the pulse signal $S_{ZCD}$. The counter 54 is configured to generate the start signal $S_{START}$ when, during the off-time, the number of pulses defined by the pulse reference signal $S_{ZC\_REF}$ has occurred. Optionally, a delay element is connected between the counter 54 and the latch, wherein the delay element 52 may delay generating the start signal $S_{START}$ for one quarter of one period of the parasitic oscillations, as already explained with reference to FIG. 5.

Referring to the above, the feedback signal $S_{FB}$ may be generated such that it indicates the power consumption of the load Z. Further, the pulse reference signal $S_{ZC\_REF}$ defines the number of pulses of the pulse signal $S_{ZCD}$ that are allowed to pass before the switch 22 is again switched on. Thus, the pulse reference signal $S_{ZC\_REF}$ defines the delay time $T_{DEL}$. According to one example, the valley skip controller 53 is configured to generate the pulse reference signal $S_{ZC\_REF}$ dependent on the feedback signal $S_{FB}$ such that the number of pulses that are allowed to pass increases as the power consumption represented by the feedback signal $S_{FB}$ decreases. In this way, the delay time $T_{DEL}$ increases and, therefore, a switching frequency of the switch 22 decreases as the power consumption decreases.

Referring to FIG. 7, the end signal SEND is provided by an on-time control circuit 55, wherein the on-time control circuit 55 receives the start signal $S_{START}$ and the feedback signal $S_{FB}$. The on-time control circuit 55 controls the duration of the on-time and causes the latch 51 to generate the off-level of the drive signal $S_{DRV}$ after a time period defined by the on-time control circuit 55 has lapsed. This time period is dependent on the feedback signal $S_{FB}$. This time period may further be dependent on other parameters of the power converter, such as the input voltage $V_{IN}$. Controlling the on-time in a power converter at least based on a feedback signal, such as the feedback signal $S_{FB}$, is commonly known so that no further explanation is required in this regard.

Figure 10:
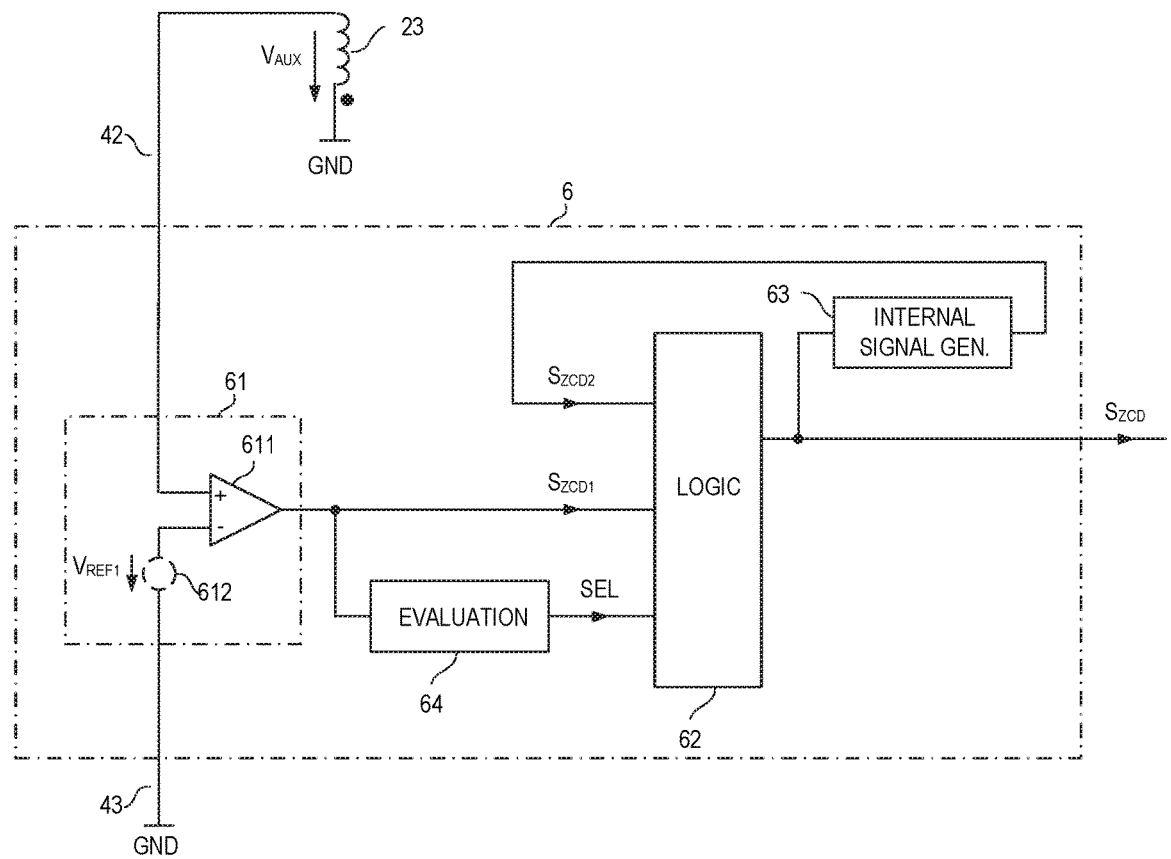
FIG. 10 illustrates one example of a pulse signal generator in the control circuit shown in FIG. 8.

FIG. 10 illustrates one example of the pulse signal generator 6 in greater detail. In this example, the pulse signal generator 6 includes a comparator circuit 61 that receives the auxiliary voltage $V_{AUX}$ and is configured to generate a first pulse signal $S_{ZCD1}$ based on comparing the auxiliary voltage $V_{AUX}$ with a reference voltage $V_{REF1}$ provided by a reference voltage source 612. According to one example, the reference voltage $V_{REF1}$ is zero. In this case, the reference voltage source 612 can be omitted. Independent of whether the reference voltage $V_{REF1}$ is zero or different from zero, events of the auxiliary voltage $V_{AUX}$ crossing the reference voltage $V_{REF1}$ are referred to as zero crossings in the following.

Referring to FIG. 10, the pulse signal generator 6 further includes a logic circuit 62 that receives the first pulse signal $S_{ZCD1}$, a second pulse signal $S_{ZCD2}$ from an internal signal generator 63, and a select signal SEL from an evaluation circuit 64. The pulse signal $S_{ZCD}$ received by the drive circuit 5 (not shown in FIG. 10) is provided by the logic circuit 62 based on the first and second pulse signals $S_{ZCD1}$, $S_{ZCD2}$ and the select signal SEL. The pulse signal $S_{ZCD}$ provided by the logic is also referred to as output pulse signal or overall pulse signal in the following.

The logic circuit 62 is configured to output the pulse signal $S_{ZCD}$, dependent on the select signal SEL, either based on the first pulse signal $S_{ZCD1}$ generated based on the auxiliary voltage $V_{AUX}$, or the internally generated second pulse signal $S_{ZCD2}$ dependent on the select signal SEL. According to one example, the logic circuit 62 generates the output pulse signal $S_{ZCD}$ based on the second pulse signal $S_{ZCD2}$ when the amplitude of the auxiliary voltage $V_{AUX}$ has decreased to below a predefined threshold. Detecting this decrease of the oscillation amplitude to below the predefined threshold can be achieved in various ways.

In the example illustrated in FIG. 10, the first pulse signal $S_{ZCD1}$ is used to detect such decaying of the oscillation amplitude. Basically, one period of the first pulse signal $S_{ZCD1}$ equals one period of the auxiliary voltage $V_{AUX}$. However, a duty cycle, which is a ratio between the time period in which the first pulse signal $S_{ZCD1}$ has a first signal level and the duration of one period of the first pulse signal $S_{ZCD1}$ may decrease over the delay time $T_{DEL}$. At the beginning of the delay time $T_{DEL}$, this duty cycle may be essentially 50% and then decreases. In this example, the reference voltage $V_{REF1}$ used to generate the first pulse signal $S_{ZCD1}$ may be zero or, in particular, higher than zero ($V_{REF1}>0$). One example of a first pulse signal $S_{ZCD1}$ is illustrated in FIG. 7.

In the example shown in FIG. 10, the evaluation circuit 64 is configured to evaluate the duty cycle of the first pulse signal $S_{ZCD1}$ and causes the logic 62 to select the second pulse signal $S_{ZCD2}$ for generating the output pulse signal $S_{ZCD}$ when the duty cycle of the first pulse signal $S_{ZCD1}$ is higher than a maximum threshold or lower than a minimum threshold. According to one example, the maximum threshold is between 70% and 90%, in particular between 80% and 90%, and the lower threshold is between 10% and 30%, in particular between 10% and 20%.

Figure 11:
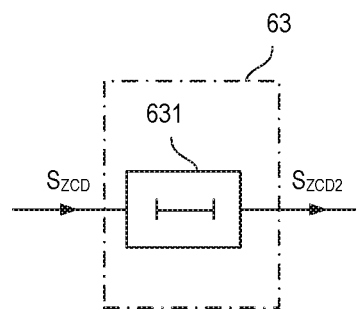
FIG. 11 illustrates one example of an internal signal generator in the pulse signal generator shown in FIG. 10.

One example of the internal signal generator 63 is illustrated in FIG. 11. In this example, the internal signal generator 63 receives the output pulse signal $S_{ZCD}$ and includes a delay element 631. The delay element 631 receives the output pulse signal $S_{ZCD}$ and is configured to generate the second pulse signal $S_{ZCD2}$ by delaying the output pulse signal $S_{ZCD}$. More specifically, when the delay element 631 receives a signal pulse of the output signal $S_{ZCD}$ it outputs a signal pulse of the second pulse signal such that there is a predefined delay time between the signal pulse of the output signal $S_{ZCD}$ and the signal pulse of the second pulse signal $S_{ZCD2}$. According to one example, "a predefined delay time between the signal pulse of the output signal $S_{ZCD}$ and the signal pulse of the second pulse signal $S_{ZCD2}$" includes that there is a predefined delay time between a predefined edge of the signal pulse of the output signal $S_{ZCD}$ and the respective edge of the signal pulse of the second pulse signal $S_{ZCD2}$. The signal pulse of the output pulse signal $S_{ZCD}$ and the signal pulse of the second pulse signal $S_{ZCD2}$ may have the same pulse length, but do not necessarily have the same pulse length.

Figure 12:
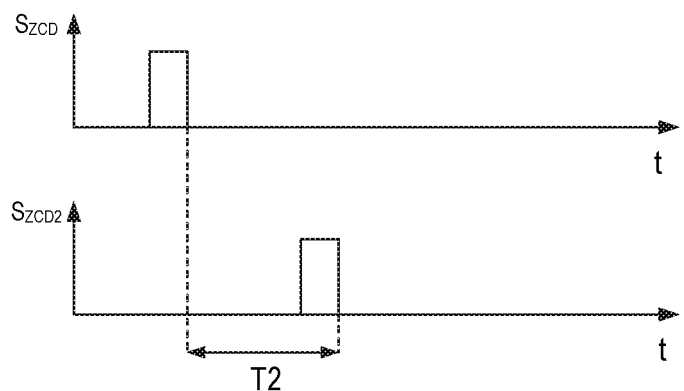
FIG. 12 show signal diagrams that illustrate the functionality of internal signal generator shown in 11.

The functionality of this internal signal generator 63 is illustrated in FIG. 12, which shows signal diagrams of the output pulse signal $S_{ZCD}$, and the second pulse signal $S_{ZCD2}$ provided by the pulse generator 632. In this example, each signal pulse of the second pulse signal $S_{ZCD2}$ is generated based on a signal pulse of the output pulse signal $S_{ZCD}$ such that there is a predefined time period T2 between a predefined edge of the signal pulse of the output pulse signal $S_{ZCD}$ and a predefined edge of the signal pulse of the second pulse signal $S_{ZCD2}$ provided by the internal signal generator 63. Just for the purpose of illustration, the predefined edge is the falling edge in the example illustrated in FIG. 11. The time period T2 is given by the delay time generated by the delay element 631.

Figure 13:
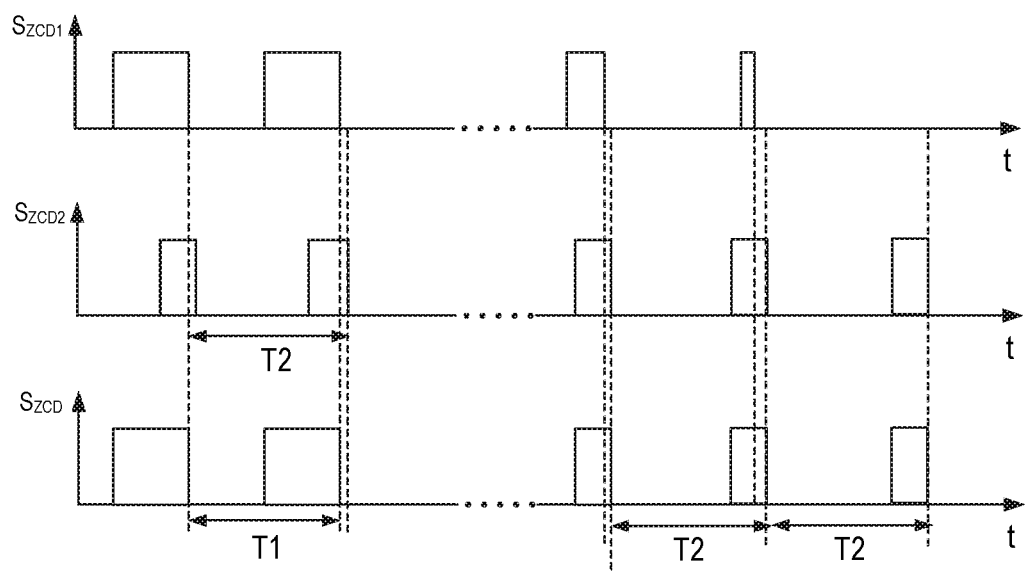
FIG. 13 show signal diagrams that illustrate the functionality of the pulse signal generator shown in FIG. 10.

FIG. 13 illustrates examples of signal diagrams of the first pulse signal $S_{ZCD1}$, the second pulse signal $S_{ZCD2}$, and the output pulse signal $S_{ZCD}$ in order to illustrate the functionality of the pulse signal generator 6 shown in FIG. 10. In this example, during a first portion of the delay time the output pulse signal $S_{ZCD}$ is defined by the first pulse signal $S_{ZCD1}$ because the duty cycle, as evaluated by the evaluation circuit 64, is within a predefined range. In a second portion of the delay time, the output pulse signal $S_{ZCD}$ is defined by the internally generated second pulse signal $S_{ZCD2}$, because the duty cycle of the first pulse signal $S_{ZCD1}$ is outside the predefined range. During the first portion, the duration T1 of one period of the output pulse signal $S_{ZCD}$ is defined by the first pulse signal $S_{ZCD1}$ and, therefore, by the auxiliary voltage $V_{AUX}$. This duration is referred to as first duration T1 in the following and essentially equals the duration of one period $T_{OSC}$ of the parasitic oscillations. Thus, the pulse signal $S_{ZCD}$ includes a first portion in which the pulse signal $S_{ZCD}$ is defined by the first pulse signal $S_{ZCD1}$ and represents local minima of the switch voltage V22. Further, the pulse signal $S_{ZCD}$ includes a first portion in which the pulse signal $S_{ZCD}$ is defined by the second pulse signal $S_{ZCD2}$, which is obtained by timely extrapolating the first pulse signal $S_{ZCD1}$, that is, by timely extrapolating the first portion of the pulse signal $S_{ZCD}$.

During the second portion of the delay time, the duration T2 of one period of the output pulse signal $S_{ZCD}$ is defined by the internal signal generator 63. More specifically, this duration T2, which is referred to as second duration in the following, is defined by the delay time of the delay element in the internal signal generator 63. This second duration T2 is adapted to the first duration T1, that is, the duration of one period $T_{OSC}$ of the parasitic oscillations. The duration of one period of the parasitic oscillations, can be obtained by measurements or simulations, so that the internal signal generator 63 can be implemented accordingly. "Adapted" may include that the second duration T1 essentially equals the first duration T1 or is longer than the first duration. "Longer" may include between 5% and 40% longer.

Referring to the above, the output pulse signal $S_{ZCD}$ is generated based on the first pulse signal $S_{ZCD1}$ in a first portion of the delay time $T_{DEL}$. In this first portion, an amplitude of the auxiliary voltage is relatively high so that switching on the switch 22 outside a valley may cause high switching losses. In this portion of the delay time, the pulse signal $S_{ZCD}$ is governed by auxiliary voltage $V_{AUX}$, so that the positions of valleys can be detected precisely. In the second portion, the parasitic oscillations have decayed so that variations of switching losses that may result from not exactly switching on in a valley are low. In the second portion, the parasitic oscillations may even have decayed to zero so that there might be no valleys of the switch voltage V22. In this second portion, a deviation of the second duration T2 from the first duration T1 can therefore be considered acceptable.

Figure 6C:
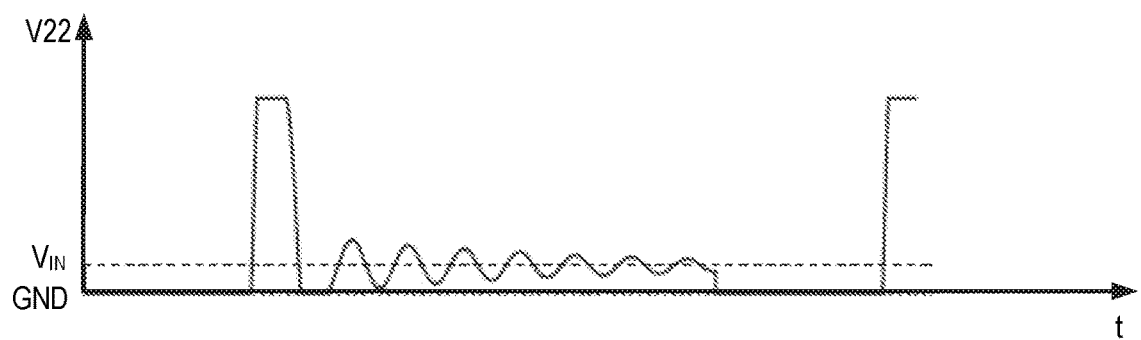
Figure 6D:
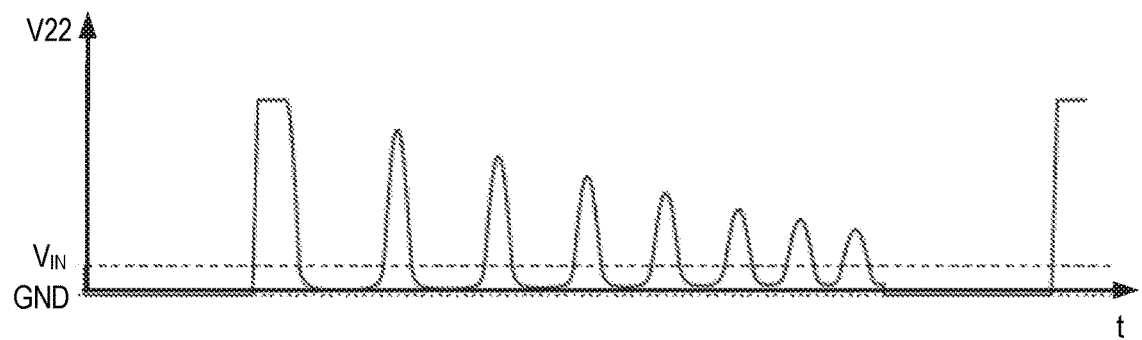
Figure 14:
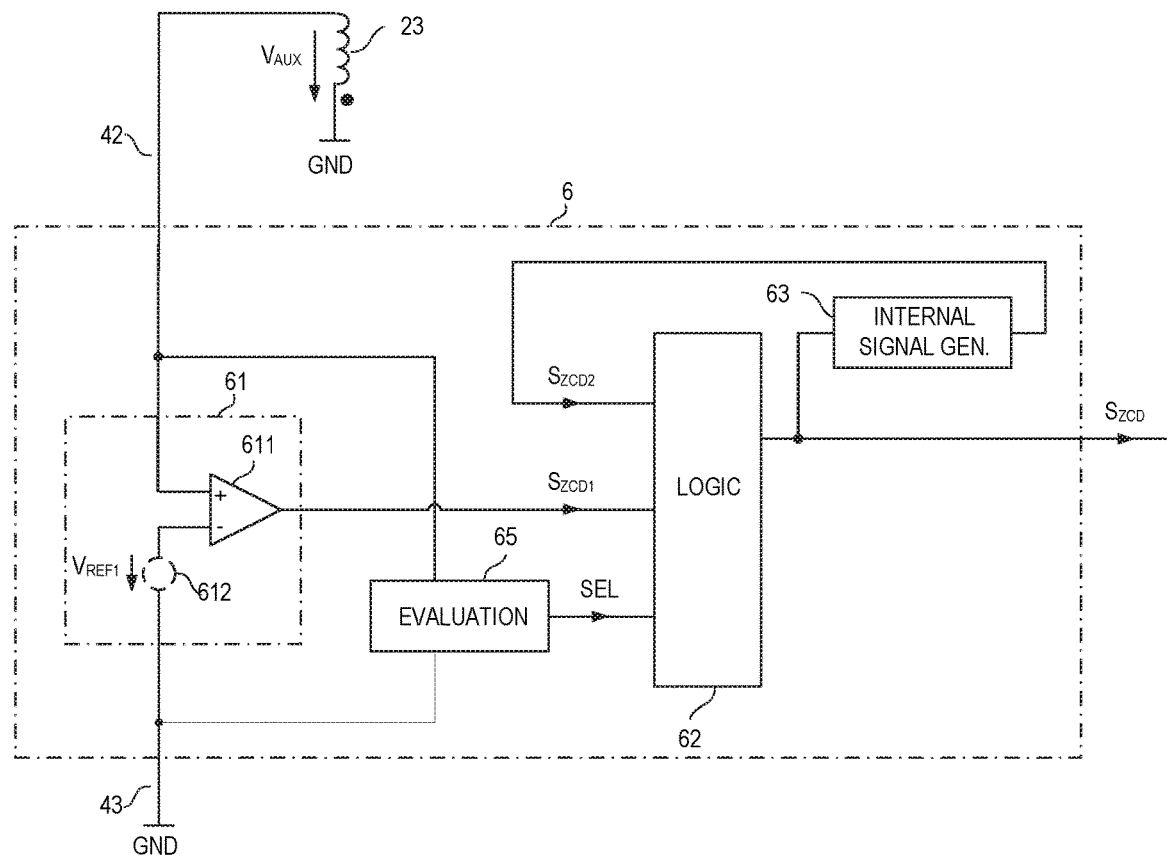
FIG. 14 illustrates a pulse signal generator according to another example.

Referring to FIG. 6D, the parasitic oscillations may be asymmetrical. For comparison reasons, parasitic oscillations that are rather symmetrical are illustrated in FIG. 6C. Asymmetric parasitic oscillations may occur, in particular, when the switch 22 used in the power converter has an output capacitance that significantly varies dependent on the switch voltage V22. A superjunction MOSFET, for example, which may be used as the electronic switch 22, has such voltage dependent output capacitance. In this case, evaluating the duty cycle of the first pulse signal $S_{ZCD1}$ might not be suitable to detect a time instance at which the parasitic oscillations have decayed to a certain extent. According to another example illustrated in FIG. 14, the pulse signal generator 6 therefore includes an evaluation circuit 65 that is configured to directly evaluate the auxiliary voltage $V_{AUX}$. According to one example, this evaluation circuit 65 is configured to cause the logic 62 to select the second pulse signal $S_{ZCD2}$ when the auxiliary voltage $V_{AUX}$ has fallen below a predefined threshold for a predefined time period or is within a predefined signal range for a predefined time period. This signal range may be implemented in various ways. Some examples are explained with reference to FIGS. 15A to 15C in the following.

Figure 15A:
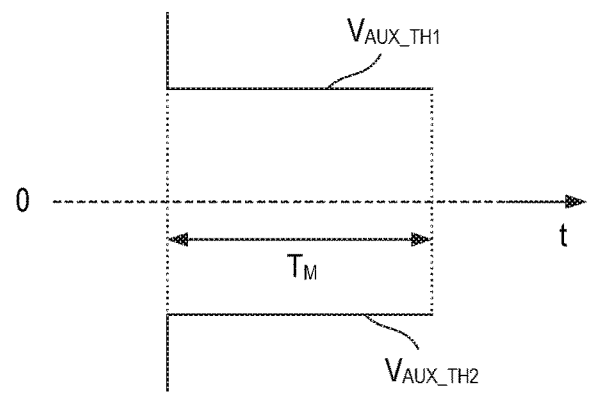
FIGS. 15A to 15C illustrate monitoring windows that may be implemented in an evaluation circuit shown in FIG. 14.
Figure 15B:
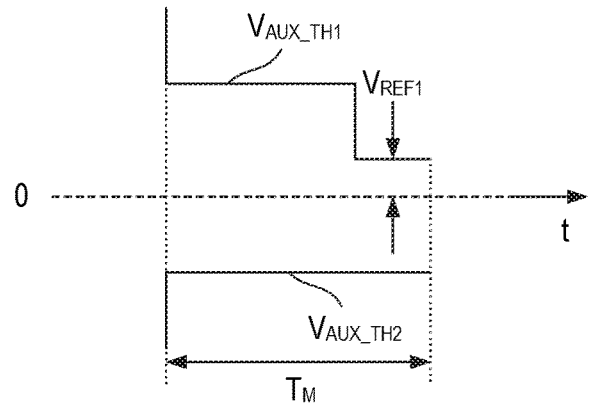

According to one example illustrated in FIG. 15A, the signal range is constant. That is, the evaluation circuit 65 monitors whether the auxiliary voltage $V_{AUX}$ is lower than a first (upper) threshold $V_{AUX\_TH1}$ and higher than a second (lower) threshold for a predefined monitoring time period $T_M$. The first and second thresholds $V_{AUX\_TH1}$, $V_{AUX\_TH2}$ may be symmetrical relative to zero. This, however, is only an example. It is also possible to implement the first and second thresholds $V_{AUX\_TH1}$, $V_{AUX\_TH2}$ such that one of these thresholds, such as the first threshold $V_{AUX\_TH1}$, has a higher magnitude than the other one of these thresholds.

Using an evaluation scheme as illustrated in FIG. 15A, the pulse signal generator 6 switches from generating the output pulse signal $S_{ZCD}$ based on the first pulse signal $S_{ZCD1}$ to generating the output pulse signal $S_{ZCD}$ based on the second pulse signal $S_{ZCD2}$, wherein the switching is only based on the auxiliary voltage $V_{AUX}$ and independent of the first pulse signal $S_{ZCD1}$. This may cause glitches in the output pulse signal $S_{ZCD}$. According to another example, the signal range is such that the magnitude of at least one of the first and second thresholds $V_{AUX}$, $V_{AUX\_TH2}$ decreases during the monitoring time period $T_M$. In the example illustrated in FIG. 15B, the magnitude of the first threshold $V_{AUX\_TH1}$ decreases and the magnitude of the second threshold is constant. Further, in this example, the decrease of the magnitude of the first threshold $V_{AUX\_TH1}$ includes one stepwise decrease. According to one example, a signal level of the decreased first threshold $V_{AUX\_TH1}$ is equal to or lower than the reference voltage $V_{REF1}$ that is used to generate the first pulse signal $S_{ZCD1}$. In this example, the pulse signal generator 6 switches to generating the output pulse signal $S_{ZCD}$ based on the second pulse signal $S_{ZCD2}$ only when the auxiliary voltage $V_{AUX}$ is below the reference voltage $V_{REF1}$ for a predefined time period. In this predefined time period no signal pulse of the first pulse signal $S_{ZCD1}$ is generated which may help to avoid glitches in the output pulse signal $S_{ZCD}$.

Figure 15C:
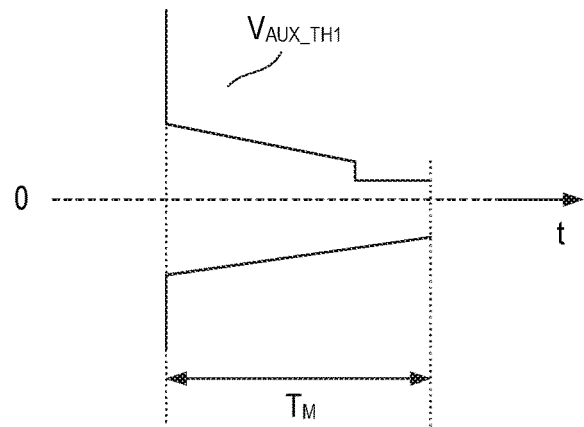

According to another example illustrated in FIG. 15C, the magnitudes of both thresholds $V_{AUX\_TH1}$, $V_{AUX\_TH2}$ decrease. Further, each of these thresholds $V_{AUX\_TH1}$, $V_{AUX\_TH2}$ decreases continuously over a certain range of time.

According to one example, the monitoring time period $T_M$ is equal to or longer than the duration $T_{OSC}$ of one period of the parasitic oscillations. As can be seen from FIG. 6D, the duration $T_{OSC}$ of one period of the parasitic oscillations may vary. Thus, the monitoring time period $T_M$ may be selected such that it is equal to or longer than the maximum expected duration of one period of the parasitic oscillations.

Providing the output pulse signal $S_{ZCD}$ based on the internally generated second pulse signal $S_{ZCD2}$ starts before the parasitic oscillations have decayed to such an extent that zero crossings can no longer be detected based on the auxiliary voltage $V_{AUX}$. An amplitude of the parasitic oscillations below which zero crossings can no longer be detected is referred to as detectability limit in the following, wherein this detectability limit may have a first limit associated with negative signal levels of the auxiliary voltage $V_{AUX}$ and a second limit associated with positive signal levels of the auxiliary voltage $V_{AUX}$. According to one example, the first and second thresholds $V_{AUX\_TH1}$, $V_{AUX\_TH2}$ are such that they correspond to at least 5 times the detectability limit. According to one example, the first and second thresholds $V_{AUX\_TH1}$, $V_{AUX\_TH2}$ are selected such that they are between 5 times and 10 times of the detectability limit.

Figure 16:
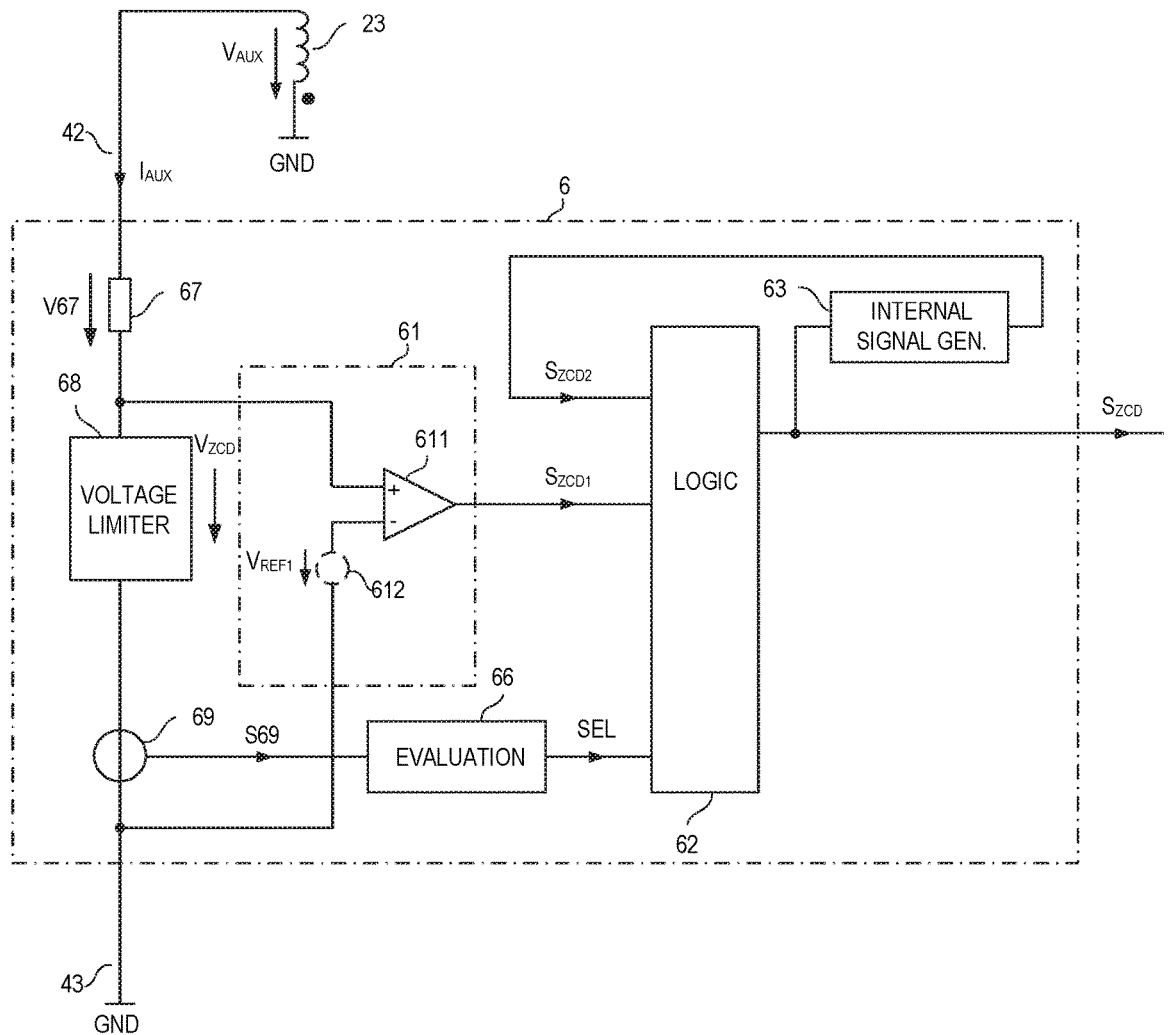
FIG. 16 illustrates a pulse signal generator according to another example.

Another example of a pulse signal generator 6 is illustrated in FIG. 16. In this example, the pulse signal generator 6 includes a voltage limiter 68 and a resistor 67 connected in series between the auxiliary voltage input 42 and the ground input 43 of the control circuit 4. The control circuit 4 may be implemented as an integrated circuit (IC). In this case, the resistor 67 may be an external resistor connected between the auxiliary winding 23 and a respective input of the IC.

Referring to FIG. 16, the pulse signal generator 6 further includes a current sensor 69 configured to measure a current $I_{AUX}$ from the auxiliary winding 23 via the resistor 67 and the voltage limiter 68 to the ground input 43. This current $I_{AUX}$ is also referred to as auxiliary current in the following. An evaluation circuit 66 receives a current measurement signal S69 that represents the auxiliary current $I_{AUX}$ from the current sensor and outputs the select signal SEL.

When the pulse signal generator 6 is implemented as illustrated in FIG. 16, the comparator circuit 61 may monitor a voltage $V_{ZCD}$ across the voltage limiter 68 instead of the auxiliary voltage $V_{AUX}$. The voltage limiter 68 is configured to clamp the voltage $V_{ZCD}$ to a first (positive) level when the auxiliary voltage $V_{AUX}$ is positive and a second (negative) level when the auxiliary voltage $V_{AUX}$ is negative. According to one example, these voltage levels are higher than the reference voltage $V_{REF1}$. The voltage $V_{ZCD}$ across the voltage limiter 68, which may be referred to as clamped auxiliary voltage or crossing detection voltage, is not proportional to the auxiliary voltage $V_{AUX}$. The clamped auxiliary voltage $V_{ZCD}$, however, is below the reference voltage $V_{REF1}$ each time the auxiliary voltage $V_{AUX}$ is below the reference voltage $V_{REF1}$. Thus, the voltage $V_{ZCD}$ across the voltage limiter can be used to detect time instances when the auxiliary voltage $V_{AUX}$ crosses the reference voltage $V_{REF1}$. In each case, the first pulse signal $S_{ZCD1}$ output by the comparator circuit 61 represents those time instances at which the auxiliary voltage $V_{AUX}$ crosses the reference voltage $V_{REF1}$, such as zero.

When the auxiliary voltage $V_{AUX}$ is higher than the voltage limit defined by the voltage limiter 68, an auxiliary current $I_{AUX}$ flows through the voltage limiter 68. In the example shown in FIG. 16, a magnitude of the auxiliary current $I_{AUX}$ is essentially given by $$I_{AUX} = \frac{V67}{R67} = \frac{V_{AUX} - V_{ZCD}}{R67}, \quad (1)$$

where R67 is a resistance of the resistor 67 and $V_{ZCD}$ is the voltage across the voltage limiter 68. According to one example, the voltage limiter 68 is implemented such that the crossing detection voltage $V_{ZCD}$ is significantly lower than the auxiliary voltage $V_{AUX}$ so that the crossing detection voltage $V_{ZCD}$ is negligible compared to the auxiliary voltage $V_{AUX}$. In this case, the auxiliary current $I_{AUX}$ measured by the current sensor 69 is essentially proportional to the auxiliary voltage $V_{AUX}$. Thus, by measuring the auxiliary current $I_{AUX}$ and monitoring the auxiliary current $I_{AUX}$ the auxiliary voltage $V_{AUX}$ can be monitored.

Figure 17:
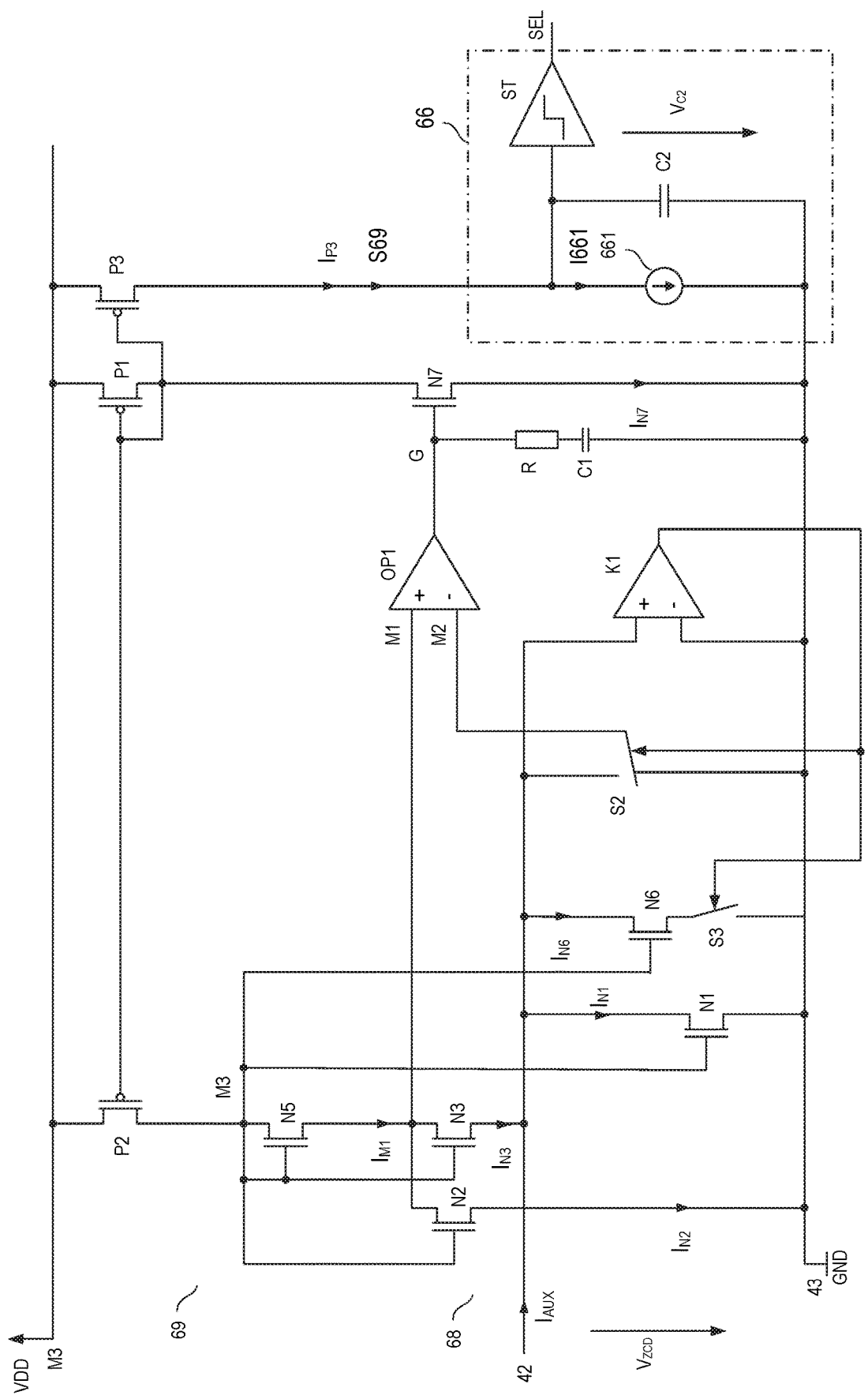
FIG. 17 illustrates one example for implementing a voltage limiter, a current sensor, and an evaluation circuit in the pulse signal generator shown in FIG. 16.

FIG. 17 illustrates one example of the voltage limiter 68, the current sensor 69, and the evaluation circuit 66. Referring to FIG. 17, the voltage limiter 68 includes a first transistor N1 connected between the auxiliary voltage input 42 and the ground input 43 of the drive circuit 4. The first transistor N1 clamps the crossing detection voltage $V_{ZCD}$. Driving the first transistor N1 in an on-state so that it clamps the crossing detection voltage $V_{ZCD}$ is explained in detail herein further below.

The voltage limiter 68 further includes a second transistor N2 connected between a first circuit node M1 and the ground node 43, and a third transistor N3 connected between the first circuit node M1 and the auxiliary voltage input 42. Further, a current regulator is configured to control a current $I_{M1}$ into the first circuit node M1 in two different ways dependent on a polarity of the auxiliary voltage $V_{AUX}$. The current $I_{M1}$ into the first circuit node is provided from a supply node M3 where a supply voltage VDD is available. The supply voltage may be provided by power supply circuit (not shown in the drawings) in the control circuit 4. This power supply may generate the supply voltage VDD based on the auxiliary voltage $V_{AUX}$ or based on any other input voltage received by the control circuit 4.

When the auxiliary voltage $V_{AUX}$ is positive, the regulator controls the current $I_{M1}$ into the first circuit node M1 such that the first transistor N1 and the second transistor N2 are operated in the same operating point and a current $I_{N3}$ through the third transistor N3 is zero. In this case, a current level of a current $I_{N2}$ through the second transistor N2 is proportional to a current $I_{N1}$ through the first transistor N1, wherein the current $I_{N1}$ through the first transistor N1 equals the auxiliary current $I_{AUX}$. According to one example, the first transistor N1 and the second transistor N2 have the same length and the same width. In this case, the current $I_{N2}$ through the second transistor N2 and the auxiliary current $I_{AUX}$ have the same current level.

According to one example, the regulator includes an operational amplifier OP1 that has a first input connected to the first circuit node M1 and second input connected to a second circuit node M2. A switch S2 that is controlled by a comparator K1 connects the second circuit node M2 to the second input 42 when the auxiliary voltage $V_{AUX}$ has the first polarity. In this case, the operational amplifier OP1 controls the current $I_{M1}$ into the first circuit node M1 such that the potential at the first circuit node M1 equals the potential at the second input 42, so that a voltage across the third transistor N3 is zero. Thus, as mentioned above, the current $I_{N3}$ through the third transistor N3 is zero.

The regulator further includes a variable resistor N7 driven by the operational amplifier OP1 and connected between the supply node M3 and the ground node 43, and a current mirror P1, P2, P3. According to one example, the variable resistor N7 includes a transistor driven by the operational amplifier. Optionally, a filter is connected between an output of the operational amplifier OP1 and the transistor of the variable resistor N7. This filter may include a series circuit with a resistor R and a capacitor C1.

The current mirror P1, P2, P3 is configured to mirror a current $I_{N7}$ through the variable resistor N7 such that the current $I_{M1}$ into the first circuit node M1 is proportional to the current $I_{N7}$ through the variable resistor N7, wherein a proportionality factor between the current through the variable resistor N7 and the current $I_{M1}$ into the first circuit node M1 is given by a current mirror ratio of the current mirror. According to one example, the current mirror ratio is 1:1, so that the current $I_{M1}$ into the first circuit M1 equals the current $I_{N7}$ through the variable resistor N7. The regulator, via the variable resistor N7 and the current mirror P1, P2, P3, adjusts the current $I_{M1}$ into the first circuit node M1 such that the current $I_{N3}$ through the third transistor N3 is zero, so that—in a steady state of the regulator—the current $I_{M1}$ into the first circuit node M1 equals the current $I_{N2}$ through the second transistor N2, wherein the latter is proportional to the auxiliary current $I_{AUX}$. Thus, given the proportionality between the current $I_{M1}$ into the first circuit node M1 and the current $I_{N7}$ through the variable resistor N7, the current $I_{N7}$ through the variable resistor N7 is proportional to the auxiliary current $I_{AUX}$.

Referring to FIG. 17, the voltage limiter 68 further includes a further transistor N5 connected between an output transistor P2 of the current mirror P1, P2, P3 and the first circuit node M1. This further transistor N5 is connected as a diode. That is, a drain node of the further transistor N5 is connected to its gate node. Further, gate nodes of the first, second and third transistors N1, N2, N3 are connected to the drain/gate node of the further transistor, so that these transistors N1, N2, N3 have the same electrical potential at their respective gate node. The first transistor N1 and the second transistor N2 are activated, so that they may conduct a current, as soon as the potential at their respective gate node reaches a level at which gate-source voltage of these transistors N1, N2 becomes higher than the respective threshold voltages. According to one example, the first, second and third transistor N1-N3 have the same threshold voltage. The threshold voltage of the fifth transistor N5 may be lower than the threshold voltages of the first, second and third transistor N1, N2, N3.

When the auxiliary voltage $V_{AUX}$ is negative the switch S2 controlled by the comparator K1 connects the second circuit node M2 to the ground input 43 and the third transistor N3 is regulated such that the potential at the first circuit node M1 equals ground potential GND. The auxiliary current $I_{AUX}$ is negative, that is, the auxiliary current $I_{AUX}$ flows in a direction opposite the direction illustrated in FIG. 17. Further, in this operating state, the auxiliary current $I_{AUX}$ is given by the current $I_{N3}$ through the third transistor N3 minus the current $I_{N1}$ through the first transistor N1. The current $I_{N2}$ through the second transistor N2 is zero, and the current $I_{M1}$ into the first circuit node M1 equals the current $I_{N3}$ through the third transistor N3. The current $I_{N7}$ through the variable resistor N7 is again proportional to the current $I_{M1}$ into the first circuit node. As the first transistor N1 and third transistor N3 are operated in the same operating point, the current $I_{N3}$ through the third transistor N3 is proportional to the auxiliary current $I_{AUX}$ wherein a proportionality factor is dependent on a size of the first transistor N1 and a size of the third transistor N3.

Referring to the above, when the auxiliary voltage $V_{AUX}$ is positive, the current $I_{N2}$ through the second transistor N2 is proportional to the auxiliary current $I_{AUX}$, wherein a proportionality factor is dependent on a size of the first transistor N1 and a size of the second transistor N2. Further, when the auxiliary voltage $V_{AUX}$ is negative, the current $I_{N3}$ through the third transistor N3 is proportional to the auxiliary current $I_{AUX}$, wherein a proportionality factor is dependent on a size of the first transistor N1 and a size of the third transistor N3. The sizes of the first, second and third transistors N1, N2, N3 can be adapted to one another such that a proportionality factor between a magnitude of the auxiliary current $I_{AUX}$ and the current $I_{M1}$ into the first circuit node M1 is the same when the auxiliary voltage $V_{AUX}$ (and the auxiliary current $I_{AUX}$) is positive and when the auxiliary voltage $V_{AUX}$ (and the auxiliary current $I_{AUX}$) is negative. In this case, these transistors N1, N2, N3 are implemented with different sizes.

According to another example, the first, second and third transistors N1, N2, N3 have the same size and the current sensor additionally includes a further transistor N6. This further transistor N6 is connected in parallel with the first transistor N1 only when the auxiliary voltage $V_{AUX}$ is positive. This is achieved by a further switch S3 connected in series with the further transistor N6 and controlled by the comparator K1. The further transistor N6 is controlled in the same way as the first transistor N1 by the potential at the third circuit node M3. In this circuit, when the auxiliary voltage $V_{AUX}$ is positive, the current $I_{N1}$ through the first transistor N1 and a current $I_{N6}$ through the further transistor N6 each equals 50% of the auxiliary current $I_{AUX}$. Further, the current $I_{N2}$ through the second transistor N2 and the current $I_{M1}$ into the first circuit node M1 equal 50% of the auxiliary current $I_{AUX}$. When the auxiliary voltage $V_{AUX}$ is negative, the current $I_{N3}$ through the third transistor and, therefore, the current into the first circuit node M1 also equals 50% of the auxiliary current, so that the proportionality factor between the magnitude of the auxiliary current $I_{AUX}$ and the current $I_{M1}$ into the first circuit node M1 and, therefore, the proportionality factor between the magnitude of the auxiliary current $I_{AUX}$ and the current $I_{N7}$ through the variable resistor N7 is the same when the auxiliary voltage $V_{AUX}$ is positive and when the auxiliary voltage $V_{AUX}$ is negative.

The clamping voltage, which is the voltage level at which the crossing detection voltage $V_{ZCD}$ is clamped by the voltage limiter 61, is predefined, but not fixed. This clamping voltage is defined by the characteristic curve of the first transistor N1 and is dependent on a current level of the auxiliary current $I_{AUX}$. Thus, at each voltage level of the auxiliary voltage $V_{AUX}$ the clamping voltage is predefined by the first transistor N1, but not fixed. Basically, the higher the auxiliary current $I_{AUX}$ the higher the clamping voltage. However, there is a square relationship between the clamping voltage and the auxiliary current $I_{AUX}$ so that variations of the clamping voltage dependent on the auxiliary current $I_{AUX}$ are essentially negligible.

According to one example, the first transistor N1 is implemented such that a voltage drop across the first transistor N1 is less than 5% or even less than 2% of the auxiliary voltage $V_{AUX}$ during the demagnetization phase. In this case, despite variations, a magnitude of the crossing detection voltage $V_{ZCD}$ is almost negligible compared to the magnitude of the auxiliary voltage $V_{AUX}$, so that in each case the auxiliary current $I_{AUX}$ is essentially proportional to the auxiliary voltage $V_{AUX}$.

In the current sensor 69 illustrated in FIG. 17, a magnitude of the current $I_{N7}$ through the transistor forming the variable resistor N7 is proportional to a magnitude of the auxiliary current $I_{AUX}$, wherein the current $I_{N7}$, independent of a current flow direction of the auxiliary current $I_{AUX}$, always flows in the same direction.

The evaluation circuit 66 shown in FIG. 17, is configured to monitor the auxiliary voltage $V_{AUX}$ by monitoring the auxiliary current $I_{AUX}$. More specifically, the evaluation circuit monitors a current $I_{P3}$ through a further output transistor P3 of the current mirror P1, P2, P3. This current $I_{P3}$ is proportional to the current $I_{N7}$ through the variable resistor N7 and, therefore, proportional to a magnitude of the auxiliary current $I_{AUX}$. The evaluation circuit includes a capacitor C2, a Schmitt trigger ST coupled to the capacitor, and a current source 661 coupled to the capacitor. The select signal SEL is generated by the Schmitt trigger ST dependent on a voltage $V_{C2}$ across the capacitor C2. According to one example, the select signal SEL is generated such that the logic 62 (not shown in FIG. 17) selects the second pulse signal $S_{ZCD2}$ for generating the output pulse signal $S_{ZCD}$ when the capacitor voltage $V_{C2}$ falls below a predefined threshold.

The capacitor C2 is charged by the current $I_{P3}$ provided by the current mirror P1, P2, P3 and is discharged by the current source 662, wherein the voltage across the capacitor C2 increases (and is limited by the supply voltage VDD) when the current mirror current $I_{P3}$ is higher than the current source current I661 and decreases when the current mirror current $I_{P3}$ is lower than the current source current I661. More specifically, the capacitor voltage $V_{C2}$ decreases when the average of the magnitude of the auxiliary current $I_{AUX}$ over each respective period of the auxiliary voltage $V_{AUX}$ is lower than the current source current I661. In particular at the end of the on-time, the capacitor voltage $V_{C2}$ may be equal to the supply voltage VDD and then varies over the delay time, wherein the capacitor voltage $V_{C2}$ may fall below the supply voltage VDD and again reach the supply voltage VDD several times dependent on the specific waveform of the auxiliary voltage $V_{AUX}$ and the auxiliary current $I_{AUX}$ before the capacitor voltage $V_{C2}$ decreases and falls below the threshold defined by the Schmitt trigger. The capacitor voltage $V_{C2}$ falling below the Schmitt trigger threshold is equivalent to the amplitude of the auxiliary voltage $V_{AUX}$ being within a predefined range for a certain time period.

The extended valley skipping mode explained above makes it possible to operate the power converter in the same kind of operating mode over a wide output power range. Referring to the above, the number of signal pulses of the pulse signal $S_{ZCD}$ that are allowed to pass before the switch 22 again switches on is dependent on the power consumption of the load, wherein the power consumption of the load may be represented by the feedback signal $S_{FB}$. More specifically, the extended valley skipping mode explained above can be considered as an extension of the valley skipping quasi-resonant mode to very low power consumptions of the load. The power converter, however, is not restricted to operate in the extended valley skipping mode. At higher power consumptions of the load, the power converter may operate in the quasi-resonant valley skipping mode or even the quasi-resonant mode. In this case, the pulse reference signal $S_{ZC\_REF}$ is such that generation of the pulse signal $S_{ZCD}$ is only governed by the first pulse signal $S_{ZCD1}$ and, therefore, the auxiliary voltage $V_{AUX}$. In the quasi-resonant mode the pulse reference signal $S_{ZC\_REF}$ is such that the switch 22 switches on in the first valley after the demagnetization time instance $t_{DEMAG}$.

Referring to the above, in the first portion of the delay time $T_{DEL}$ the pulse signal $S_{ZCD}$ is generated such that it represents local minima of the switch voltage V22. That is, based on the pulse signal $S_{ZCD}$ generated in the first portion of the delay time $T_{DEL}$ time instances at which local minima of the switch voltage V22 occur can be determined at least approximately. Generating the pulse signal $S_{ZCD}$ in the first portion of the delay time $T_{DEL}$ based on comparing the auxiliary voltage $V_{AUX}$ with a predefined threshold, as explained above, is only an example. Any other signal that is suitable to detect the time instances of local minima of the switch voltage may be used as well.

According to another example, the pulse signal $S_{ZCD}$ is generated based on comparing the inductor voltage V21 with a predefined threshold, such as zero, or based on comparing the switch voltage V22 with a predefined threshold, such as the voltage level of the input voltage. In these examples, time instances at which the respective voltage crosses the respective threshold are offset to the time instances of the local minima of the switch voltage V22.

According to another example, an evaluation circuit receives the switch voltage V22 and is configured to detect time instances of local minima of the switch voltage V22, for example, based on differentiating the switch voltage V22 and detecting time instances when the differentiated switch voltage crosses zero. The pulse signal $S_{ZCD}$, in the first portion of the delay time $T_{DEL}$, may then be generated such it directly represents the time instances when local minima of the switch voltage V22 occur.

The invention claimed is:

1. A method comprising:
   driving an electronic switch coupled to an inductor in a power converter, the electronic switch driven for each of multiple successive drive cycles, each of the drive cycles including an on-time and an off-time of controlling the electronic switch,
   wherein each of the off-times includes: i) a demagnetization time period in which the inductor is demagnetized and ii) a delay time,
   wherein an end of the delay time is dependent on an occurrence of a predefined number of signal pulses of a pulse signal; and
   wherein the pulse signal includes a first portion that represents a voltage across the switch and, the pulse signal including a second portion that includes signal pulses obtained by timely extrapolating the pulse signal from the first portion;
   wherein the pulse signal indicates a minimum voltage across the switch, the pulse signal being based on an auxiliary voltage across an auxiliary winding inductively coupled to the inductor, the method further comprising:
monitoring the auxiliary voltage; and
starting a second portion of the delay time based on the monitoring.

2. The method of claim 1 further comprising:
generating the pulse signal based on the auxiliary voltage, generation of the pulse signal including:
comparing a signal level of the auxiliary voltage with a predefined threshold; and
generating the pulse signal based on the comparing.

3. The method of claim 2, wherein generating the pulse signal based on the comparing comprises:
generating a signal pulse of the pulse signal when the auxiliary voltage crosses the predefined threshold in a predefined direction.

4. The method as in claim 1, wherein timely extrapolating the pulse signal generated in the first portion of the delay time comprises:
generating each signal pulse in the second portion of the delay time after a predefined time period after a preceding signal pulse of the pulse signal.

5. The method of claim 1, wherein monitoring the auxiliary voltage comprises monitoring a duty cycle of the pulse signal generated in the first portion of the delay time, and
wherein the second portion starts when the duty cycle is outside a given duty cycle range.

6. The method of claim 1, wherein monitoring the auxiliary voltage comprises monitoring a signal level of the auxiliary voltage, and
wherein the second portion starts when the signal level of the auxiliary voltage meets a predefined criterion.

7. The method of claim 6, wherein the signal level of the auxiliary voltage meets the predefined criterion when the signal level is within a predefined signal range for a predefined time period.

8. The method of claim 7, wherein the predefined signal range varies over the predefined time period.

9. The method of claim 7, wherein monitoring the auxiliary voltage comprises monitoring a signal level of an auxiliary current flowing between the auxiliary winding and a voltage limiter coupled to the auxiliary winding.

10. The method of claim 9, wherein monitoring the signal level of the auxiliary current comprises charging a capacitor with a current that is proportional to a magnitude of the auxiliary current and discharging the capacitor with a constant current, and
wherein the auxiliary voltage meets the predefined criterion when a voltage across the capacitor crosses a predefined threshold.

11. The method of claim 1 further comprising:
generating a feedback signal based on an output signal of the power converter; and
wherein the predefined number is selected dependent on the feedback signal.

12. The method of claim 1, wherein the power converter is one of a flyback converter and a boost converter.

13. A control circuit operative to drive an electronic switch coupled to an inductor in a power converter in successive drive cycles, each of the drive cycles including an on-time and an off-time, wherein the off-time includes: i) a demagnetization time period in which the inductor is demagnetized and ii) a delay time,
the control circuit is operative to:
end the delay time dependent on an occurrence of a predefined number of signal pulses of a pulse signal comprising a plurality of successive signal pulses, and
generate the pulse signal, a first portion of the pulse signal representing a local minima of a voltage across the switch and a second portion of the pulse signal representing signal pulses obtained by timely extrapolating the pulse signal of the first portion;
wherein the pulse signal indicates a minimum voltage across the switch, the pulse signal being based on an auxiliary voltage across an auxiliary winding inductively coupled to the inductor, the control circuit further operative to:
monitor the auxiliary voltage; and
start the second portion of the delay time based on the monitoring.

14. An apparatus comprising:
an inductor device;
a switch coupled to the inductor;
a controller operative to control operation of the switch for each of multiple control cycles to convert an input voltage into an output voltage, activation of the switch during an ON-time causing current to flow through the inductor and the switch, deactivation of the switch during an OFF-time causing current to flow through the inductor and the switch;
the controller operative to:
during the OFF-time, after passage of an amount of time with respect to deactivating the switch, detect occurrence of oscillations of a voltage across the switch; and
initiate re-activation of the switch in a subsequent control cycle after a time delay with respect to the detected occurrence of oscillations of the voltage across the switch.

15. The apparatus as in claim 14, further comprising:
an auxiliary winding magnetically coupled to the inductor, the auxiliary winding producing the oscillations of the voltage; and
wherein the controller monitors the auxiliary winding to detect the oscillations.

16. The apparatus as in claim 14, wherein deactivation of the switch during the time delay demagnetizes the inductor.

* * * * *